US011275754B2

(12) United States Patent
Wilson et al.

(10) Patent No.: US 11,275,754 B2
(45) Date of Patent: Mar. 15, 2022

(54) APPLICATION DEVELOPMENT PLATFORM USING PRE-DEFINED LOGIC BASED ON ASSUMPTIONS

(71) Applicant: Breakthrough Technologies, Evanston, IL (US)

(72) Inventors: Douglas A. Wilson, Deerfield, IL (US); Randall Eugene Knapp, Evanston, IL (US); Gus Koumarelas, Park Ridge, IL (US); Daniel Binyamin Weiner, Chicago, IL (US); Craig James Brentz, Chicago, IL (US)

(73) Assignee: Breakthrough Technologies, Evanston, IL (US)

( * ) Notice: Subject to any disclaimer, the term of this patent is extended or adjusted under 35 U.S.C. 154(b) by 234 days.

(21) Appl. No.: 16/057,103

(22) Filed: Aug. 7, 2018

(65) Prior Publication Data
US 2019/0392043 A1 Dec. 26, 2019

Related U.S. Application Data

(60) Provisional application No. 62/687,450, filed on Jun. 20, 2018.

(51) Int. Cl.
*G06F 9/448* (2018.01)
*G06F 9/54* (2006.01)
(Continued)

(52) U.S. Cl.
CPC .......... *G06F 16/252* (2019.01); *G06F 9/448* (2018.02); *G06F 9/54* (2013.01); *G06F 16/211* (2019.01); *G06F 16/24549* (2019.01)

(58) Field of Classification Search
CPC .............. G06F 16/252; G06F 16/211; G06F 16/24549; G06F 9/54; G06F 9/448;
(Continued)

(56) References Cited

U.S. PATENT DOCUMENTS

| 6,438,742 | B1 * | 8/2002 | McCann | ................... G06F 8/34 |
| | | | | 717/109 |
| 8,266,550 | B1 * | 9/2012 | Cleron | ................ G06F 3/04845 |
| | | | | 715/863 |

(Continued)

OTHER PUBLICATIONS

Appian, "Low-Code App Development Platform", www.appian.com/platform/low-code/, 2018, pp. 1-5.
(Continued)

*Primary Examiner* — Jorge A Casanova
(74) *Attorney, Agent, or Firm* — Christopher P. Maiorana, PC

(57) ABSTRACT

A method for generating an application includes the steps of defining a plurality of assumptions, providing an input mode configured to receive input, generating a schema configured to enable the application to access a data model, generating an interface for the data model in response to the assumptions and generating functions to perform database operations for the data model at runtime for each request. The input may enable customization of objects of the data model. The assumptions may provide constraints for the input. The constraints may ensure the schema is valid. The assumptions may define a location for displaying the objects on the interface. The input mode may enable the input to customize the objects via a guided indirect code implementation. The interface may enable a user to modify properties of the objects. The interface may comprise a dynamic application programming interface to perform the database operations.

14 Claims, 17 Drawing Sheets

(51) Int. Cl.
*G06F 16/21* (2019.01)
*G06F 16/2453* (2019.01)
*G06F 16/25* (2019.01)

(58) Field of Classification Search
CPC . G06F 8/31; G06F 8/38; G06F 3/0483; G06F 16/212; G06F 3/0482; G06F 3/04842; G06F 3/0486; G06F 8/34
See application file for complete search history.

(56) References Cited

U.S. PATENT DOCUMENTS

| | | | | |
|---|---|---|---|---|
| 9,372,675 | B1 | 6/2016 | Pescosolido et al. | |
| 9,544,383 | B1 | 1/2017 | Calkins et al. | |
| 10,223,076 | B1* | 3/2019 | Owen | G06F 8/20 |
| 2003/0074177 | A1* | 4/2003 | Bowen | G06F 30/33 |
| | | | | 703/22 |
| 2005/0015746 | A1* | 1/2005 | Shukla | G06F 8/34 |
| | | | | 717/109 |
| 2005/0172261 | A1* | 8/2005 | Yuknewicz | G06F 8/38 |
| | | | | 717/106 |
| 2005/0177837 | A1* | 8/2005 | Mensah | G06F 9/46 |
| | | | | 719/328 |
| 2017/0255663 | A1* | 9/2017 | Woschitz | G06F 16/2322 |
| 2018/0157468 | A1* | 6/2018 | Stachura | G06F 8/38 |

OTHER PUBLICATIONS

Outsystems, "Low-Code Development Platform for Mobile and Web Apps", www.outsystems.com/platform/, 2018.
Mendix, "Application Platform as a Service", www.mendix.com/application-platform-as-a-service/, 2018, pp. 1-7.
The Provider, "Cross-Platform Open Source Plain-Text File Notepad", www.qownnotes.org/, 2017, pp. 1-4.
Wikipedia, "Evernote", en.wikipedia.org/wiki/Evernote, 2017, pp. 1-8.
Owncloud, "Features", https://owncloud.org/features, 2017, pp. 1-8.
Howtogeek, "How to Sync Cortana Reminders From a Windows 10 PC to Your iPhone or Android Phone", www.howtogeek.com/286813/how-to-sync-cortana-reminders-from-a-windows-10-pc-to-your-iphone-or-android-phone/, 2017, pp. 1-6.
IBM, "IBM Notes—United States", www.ibm.com/us-en/marketplace/enterprise-email/details#product-header-top, 2017, p. 1.
Wikipedia, "IBM Notes", en.wikipedia.org/wiki/IBM_Notes, 2017, pp. 1-15.
Pushbullet, "Your Devices Working Better Together", www.pushbullet.com/, 2017, pp. 1-2.
Pushbullet, "Pushbullet's IFTTT Channel Is Online!", https://blog.pushbullet.com/2014/03/19/the-pushbullet-ifttt-channel-is-online/, 2017, p. 1.
Julian Robichaux, "What Is Lotus Notes?", www.nsftools.com/misc/WhatisNotes.htm, 2017, pp. 1-7.

* cited by examiner

US 11,275,754 B2

APPLICATION DEVELOPMENT PLATFORM USING PRE-DEFINED LOGIC BASED ON ASSUMPTIONS

This application relates to U.S. Provisional Application No. 62/687,450 filed Jun. 20, 2018, which is hereby incorporated by reference in its entirety.

FIELD OF THE INVENTION

The invention relates to application development generally and, more particularly, to a method and/or apparatus for an application development platform using pre-defined logic based on assumptions.

BACKGROUND

Many applications are highly specialized for particular areas of business (i.e., accounting, marketing, website design, etc.). Generalized solutions are costly and involve many hours and resources to implement and customize. Since the generalized solutions involve considerable resources, the solutions are often limited to particular platforms or have limited accessibility outside of a particular use case. Instead many users collaborate inefficiently by relying on tools to solve problems that the tools were never suited to solve (i.e., emailing spreadsheets, cloud-based file-lockers, exchanging portable storage drives, etc.). Off-the-shelf platforms are too narrow in scope and custom platforms are too expensive.

Many businesses do not have the skill set to design in-house solutions. A citizen developer could design an application platform that solves a unique problem of a business but programming skills involve a significant amount of training and education. Without accessible tools to develop an application, citizen developers are not a viable solution.

It would be desirable to implement an application development platform using pre-defined logic based on assumptions.

SUMMARY

The invention concerns a method for generating an application. The method may comprise the steps of defining a plurality of assumptions, providing a data input mode configured to receive user input, generating a database schema configured to enable the application to access the data model, generating a database interface for the data model in response to the assumptions and generating functions to perform database operations for the data model at runtime for each request. The user input may enable customization of objects of a data model for the application and assumptions may provide constraints for the user input. The constraints may ensure the database schema is valid. The assumptions may define a location for displaying the objects on the database interface. The data input mode may enable the user input to customize the objects via a guided indirect code implementation. The database interface may enable a user to modify properties of the objects. The database interface may comprise a dynamic application programming interface configured to perform the database operations for the data model.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing an application development platform that may (i) be a low-code development platform, (ii) enable creation, management and deployment of applications, (iii) enable application to be created quickly, (iv) provide permissions to applications to restrict access as desired, (v) provide an application programming interface to enable a citizen developer to design a custom solution, (vi) define assumptions for a look and feel of an application to facilitate rapid implementation, (vii) be implemented cross-platform, (viii) restrict customization using pre-defined logic to ensure a valid data schema, (ix) be a no-code development platform and/or (x) be accessible locally and remotely.

Figure 1:
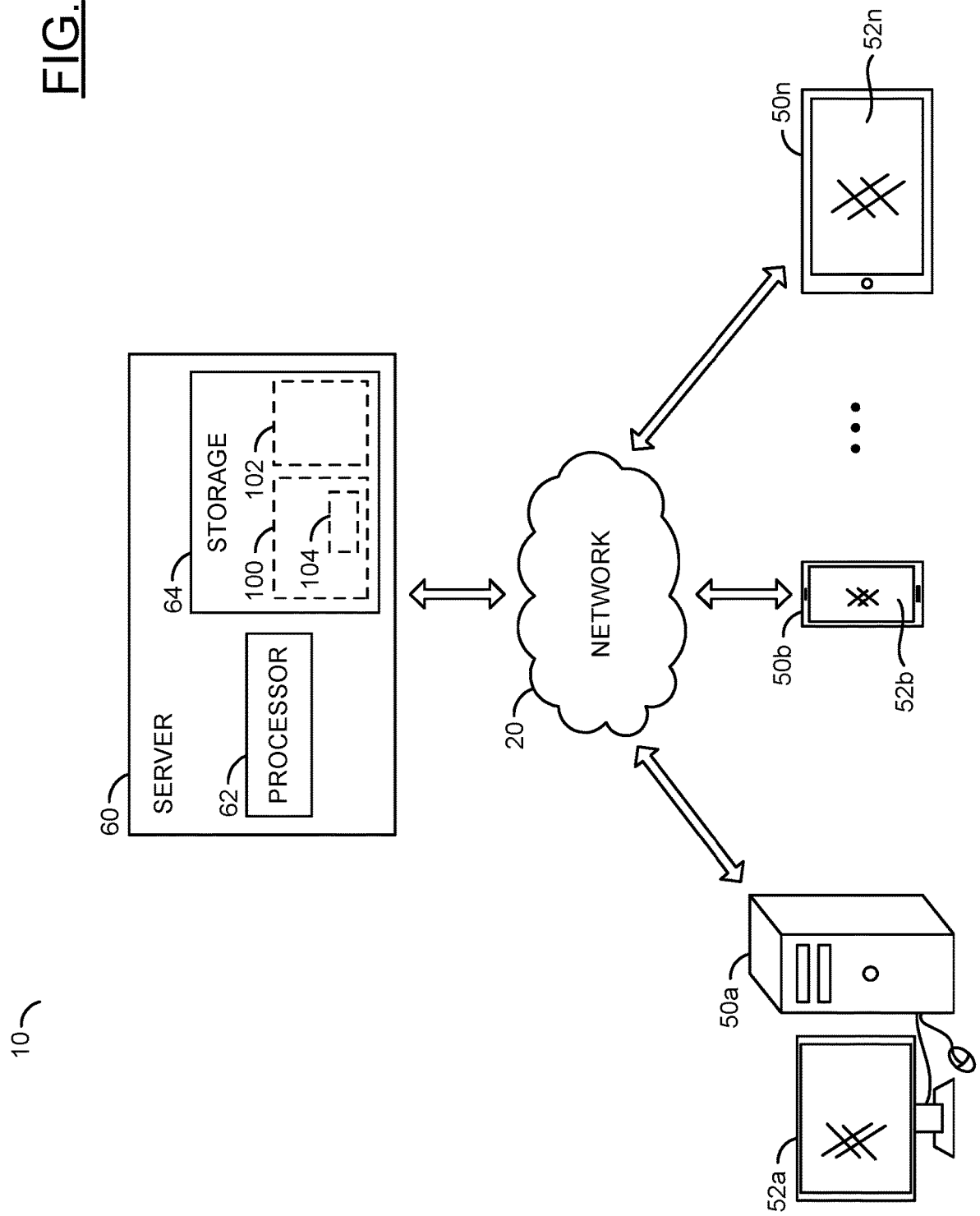
FIG. 1 is a diagram illustrating a context of the present invention.

Referring to FIG. 1, a diagram illustrating a context of the invention. A system 10 is shown. The system may be configured to present and/or implement an application development platform. The application development platform may provide a guided indirect code implementation. For example, the application development platform may be a low-code application development platform. In another example, the application development platform may be a no-code application development platform. The system 10 may comprise a block (or circuit) 20, blocks (or circuits) 50a-50n, blocks (or circuits) 52a-52n) and/or a block (or circuit) 60. The block 20 may be a network. Blocks 50a-50n may implement computing devices. Blocks 52a-52n may implement display and/or input devices. The block 60 may implement a server computer. The system 10 may comprise other components (not shown). The number and/or types of components of the system 10 may be varied according to the design criteria of a particular implementation.

The network 20 may enable communication between the various components of the system 10. In an example, the network 20 may be the Internet and/or a wide area network. Some of the components of the system 10 may communicate with the internet 20 wirelessly. Some of the components of the system 10 may communicate with the Internet 20 via a hard-wired connection.

The computing devices (or user devices) 50a-50n may be configured to execute computer readable instructions (e.g., executable programs, apps, binaries, etc.). For example, the computing devices 50a-50n may be implemented as a desktop computer, a laptop computer, a netbook computer, a tablet computing device, a phablet computing device, a smartphone, a smartwatch, smart clothing (e.g., clothing with LTE communication built in), human implantable devices (e.g., a computer chip embedded under the skin), a virtual reality headset, etc. In an example, the computing devices 50a-50n may be capable of 3G/4G/LTE/5G communication. Generally, the computing devices 50a-50n may be a device capable of data transmission to the network 20 and may comprise a display, a processor, a memory, an input (e.g., mouse, keyboard, touchscreen, voice recognition, etc.) and/or an output (e.g., a display, haptic feedback, a speaker, etc.). The type and/or features of the computing devices 50a-50n may be varied according to the design criteria of a particular implementation.

Each of the computing devices 50a-50n may be configured to connect to the network 20 (e.g., hard-wired, Wi-Fi, etc.). The computing devices 50a-50n may be configured to store and/or execute computer readable instructions received from the server 60 and/or stored locally. Executing the computer readable instructions may enable the computing devices 50a-50n to display various interfaces, generate output and/or receive input. For example, the computing devices 50a-50n may be configured to access and/or execute a front-end for interacting with a back-end system implemented on the server 60.

The display and/or input devices 52a-52n may be configured to enable a user to interact with the computing devices 50a-50n. In some embodiments, the display and/or input devices 52a-52n may be implemented as peripheral devices connected to the computing devices 50a-50n (e.g., a monitor, a mouse, a keyboard, etc.). In some embodiments, the display and/or input devices 52a-52n may be implemented as an integrated component of the computing devices 50a-50n (e.g., a touchscreen interface, an infotainment system, etc.). Generally, the display and/or input devices 52a-52n may present output to the user (e.g., a video display, audio, various interfaces, etc.) and/or receive input from the user.

The server 60 may be configured to store data, retrieve and transmit stored data, process data and/or communicate with other devices. In an example, the server 60 may implement an application storage server. The server 60 may comprise a content delivery network and/or a cloud-based service. The server 60 may be implemented as part of a cloud computing platform (e.g., distributed computing). In an example, the server 60 may be implemented as a group of cloud-based, scalable server computers. By implementing a number of scalable servers, additional resources (e.g., power, processing capability, memory, etc.) may be available to process and/or store variable amounts of data. For example, the server 60 may be configured to scale (e.g., provision resources) based on demand. The server 60 may implement scalable computing (e.g., cloud computing). The scalable computing may be available as a service to allow access to processing and/or storage resources without having to build infrastructure (e.g., the provider of the system 10 may not have to build the infrastructure of the server 60).

The server 60 may be configured to execute computer readable instructions. In an example, the server 60 may process HTML, CSS, JavaScript, PHP, SQL, GraphQL, AJAX applications, APIs, etc. The server 60 may be configured to distribute apps (e.g., in the form of computer readable instructions) to the computing devices 50a-50n. The server 60 may be configured to generate interfaces (e.g., graphical user interfaces) based on stored data for the computing devices 50a-50n and/or the display and/or input devices 52a-52n. For example, the server 60 may generate data to implement an interface, the data may be sent to the computing devices 50a-50n, the computing devices 50a-50n may interpret the data to generate an interface, the user may interact with the interface using the display and/or input devices 52a-52n to provide requests, the computing devices 50a-50n may transmit the requests to the server 60 and the server may process the requests. The processing capabilities and/or functionality of the server 60 may be varied according to the design criteria of a particular implementation.

The server 60 may comprise a block (or circuit) 62 and/or a block (or circuit) 64. The circuit 62 may implement a processor. The processor 62 may be configured to execute computer readable instructions and/or perform user-requested operations. The block 64 may implement storage media. For example, the processor 62 may retrieve data stored in the storage 64, manipulate data stored in the storage 64 and/or write to the storage 64. The server 60 may comprise other components (not shown). The number and/or types of components implemented by the server 60 may be varied according to the design criteria of a particular implementation.

The storage 64 may implement a block (or circuit) 100 and/or a block (or circuit) 102. The block 100 may be computer readable instructions. The block 102 may implement a database. The computer readable instructions 100 may be configured to implement an application development platform and/or implement the applications developed using the application development platform. The computer readable instructions 100 may be executable by the processor 62. The database 102 may implement a remotely accessible database. The database 102 may perform database operations such as storing data and/or filtering the stored data in response to search parameters. For example, search parameters may be transmitted by the computing devices 50a-50n and the database 102 may be searched (e.g., queried) based on the search parameters. Access to and/or queries performed by the database 102 may be constrained by the computer readable instructions 100.

The computer readable instructions 100 may be configured to be accessed by the computing devices 50a-50n. In some embodiments, the computer readable instructions 100 may be executed by the processor 62 and accessed by the computing devices 50a-50n. For example, the computing devices 50a-50n may implement a web browser to connect to the server 60 and access the computer readable instructions 100 (e.g., a web-based application). In some embodiments, the computer readable instructions 100 may be downloaded to the computing devices 50a-50n and executed locally (e.g., an app, a program, an executable binary, etc.). The computer readable instructions 100 may have a cross-platform implementation. For example, the computer readable instructions 100 may be operational on various operating system platforms (e.g., Windows, iOS, Linux, Android, Windows Phone, macOS, Chromium OS, Blackberry, etc.). The delivery, accessibility and/or execution of the computer readable instructions 100 may be varied according to the design criteria of a particular implementation.

The computer readable instructions 100 may comprise a block (or circuit) 104. The block 104 may comprise assumptions. In some embodiments, the assumptions may be a default setting, a template and/or a convention. The computer readable instructions 100 may define the various assumptions 104. The assumptions 104 may be defined before the computer readable instructions 100 are executed. In an example, the assumptions 104 may pre-define a location and/or layout for particular objects and/or data to be arranged on the interfaces displayed by the display devices 52a-52n. Various data types used by the database 102 may be arranged in classes of pre-defined locations. The pre-defined locations for an object may be determined based on the class of the object. The assumptions 104 may be updated.

The assumptions 104 may be implemented to define where various objects and/or classes of objects will be displayed. The assumptions 104 may be implemented to shortcut various difficult and/or expensive steps when developing custom applications. Instead of asking a user what is desired and/or providing extensive and/or labor-intensive customization tools, the assumptions 104 may take the data input and arrange the data in a pre-configured format. The assumptions 104 may be implemented to enable the resulting application to go from design to usable product quickly without prompting the user for feedback and/or guidance (or limiting the amount of prompts to the user). The assumptions 104 may change an artisan design process to an accessible process. For example, the locations defined by the assumptions 104 may be adjusted without input from the user. Generally, the assumptions 104 may be defined before the users have access to the various data input modes. The assumptions 104 may be defined at a software level (e.g., as part of the computer readable instructions 100). The assumptions 104 may be updatable.

The assumptions 104 may comprise a number of constraints. The constraints may provide a limitation on customization in favor of simplicity. The assumptions 104 may comprise a number of trade-offs (e.g., limitations on layout and/or settings) to focus on what most users use. For example, one limitation may be that the assumptions 104 may prevent solving a particular corner case. The assumptions 104 may provide convention over configuration. In one example, the assumptions 104 may define various views for the application interface (e.g., a list view, a grid view, a single view, etc.). In another example, the assumptions 104 may define various roles and/or permissions (e.g., administrator, write access, read-only access, etc.). In yet another example, the assumptions 104 may define various compatible devices and/or displays (e.g., have a graphical user interface designed for smaller screen sizes, designed for touch-based control, have a graphical user interface designed for larger screen sizes, designed for mouse and keyboard based control, etc.). In one example, the assumptions 104 may implement a responsive design to enable progressive enhancement based on screen and/or viewport size (e.g., fewer options may be visible on a smaller viewport and more options may be visible on a larger viewport). The number and/or types of assumptions 104 may be varied according to the design criteria of a particular implementation.

The assumptions 104 may provide a general pipeline to support the database 102. The constraints imposed by the assumptions 104 may be configured to avoid situations where the user defines data models and/or instructions that are not supported by the database 102 (e.g., invalid operations, improperly declared objects, invalid input, etc.). The constraints imposed by the assumptions 104 may ensure that the database 102 is functional (e.g., ensure that a schema for the database 102 is valid).

Figure 2:
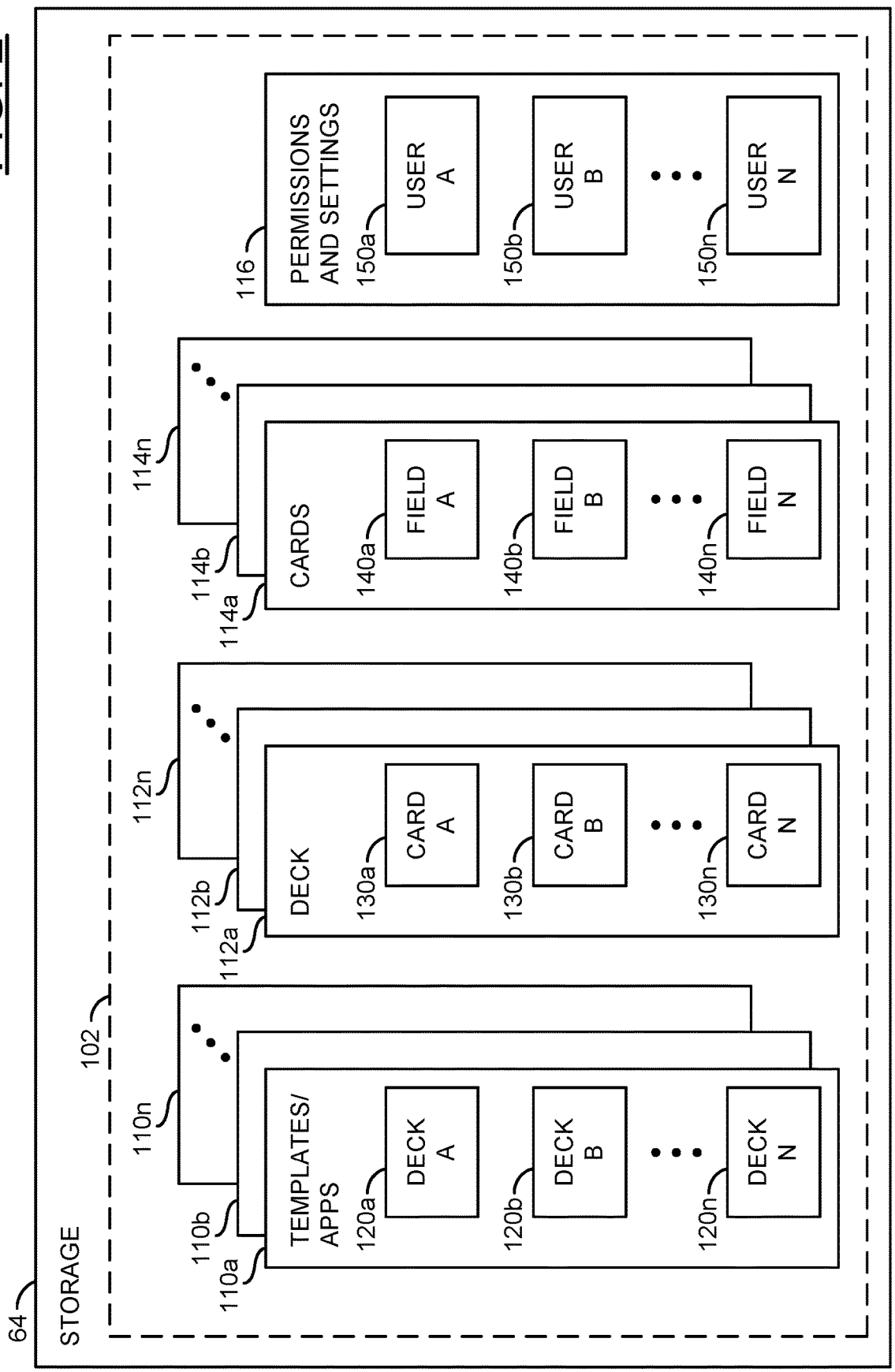
FIG. 2 is a diagram illustrating a data model structure of an application platform.

Referring FIG. 2, a diagram illustrating a data model structure of an application platform is shown. The database 102 is shown as part of the storage 64. The database 102 is shown comprising a number of blocks 110a-110n, a number of blocks 112a-112n, a number of blocks 114a-114n and/or a block 116. The blocks 110a-110n may implement apps and/or templates. The blocks 112a-112n may implement decks. The blocks 114a-114n may implement cards. The block 116 may implement permissions and/or settings. The blocks 110a-116 may each represent various data types, data structures, data objects and/or data models. The database 102 may comprise other data structures (not shown). The number and/or type of data structures implemented by the database 102 may be varied according to the design criteria of a particular implementation.

The computer readable instructions 100 may implement an application development platform. In one example, the computer readable instructions 100 may implement a multi-tenant (e.g., multi-user) and/or low-code/no-code platform. The users may structure data in the database 102 using a structure comprising the apps 110a-110n, the decks 112a-112n and/or the cards 114a-114n. The computer readable instructions 100 may enable the database 102 to be implemented in an ad-hoc manner. For example, various data types and/or data structures, and the associated properties, may be added and/or removed on the fly. The assumptions 104 may ensure that any changes made will result in a valid result. The compute readable instructions 100 may be configured to manage and/or expose the various data model entities (e.g., the apps 110a-110n, the decks 112a-112n and/or the cards 114a-114n) may be exposed via a REST-based (representational state transfer) API. Functions to perform the database operations for each of the data models may be generated by the computer readable instructions 100 at runtime for each request made by a user.

The apps 110a-110n may be data structures for applications developed using the low-code and/or no-code implementation provided by the computer readable instructions 100. The apps 110a-110n may comprise a database schema configured to access a data model. The apps 110a-110n may be accessed by the computing devices 50a-50n. The apps 110a-110n may each comprise a number of associated decks 120a-120n. The associated decks 120a-120n may each be one of the decks 112a-112n that are associated with a particular one of the apps 110a-110n. The apps 110a-110n may provide a logical grouping of related decks 120a-120n (or objects). In some embodiments, the apps 110a-110n may be akin to databases and/or schemas of a relational database management system.

The decks 112a-112n may be data objects. The decks 112a-112n may comprise the data model. The decks 112a-112n may be akin to database tables of a relational database management system. Each of the decks 112a-112n may comprise a number of associated cards 130a-130n. The associated cards 130a-130n may each be one of the cards 114a-114n that are associated with a particular one of the decks 112a-112n.

The cards 114a-114n may be a collection of data properties that follow the data structure and/or data model of the decks 112a-112n. The cards 114a-114n may comprise a number of fields (or properties) 140a-140n. The properties 140a-140n may be associated with one of the cards 114a-114n. The properties 140a-140n may be the individual input data elements. The properties may be akin to columns of a database in a relational database management system.

The permissions and settings 116 may be defined by the assumptions 104. The permissions and settings 116 may comprise a number of users 150a-150n. In one example, the users 150a-150n may be assigned one or more roles for the apps 110a-110n. For example, the permissions and settings 116 may store which of the users 150a-150n have access (e.g., read access, write access, execute access, administrator rights, etc.) to the apps 110a-110n.

The computer readable instructions 100 may enable the apps 110a-110n to support custom data models. The custom data models may be enabled by implementing a dynamic data model. The computer readable instructions 100 may provide an API to manage the data (e.g., the cards 114a-114n) within dynamic data models. The assumptions 104 may be configured to ensure that the dynamic data models are valid (e.g., do not cause errors). In an example, a JSON-based data type may be implemented to support both dynamic and/or sparse data storage as well as efficient querying (e.g., database operations).

The dynamic tenant-based API implemented by the computer readable instructions 100 may provide a support for database operations. For example, the database operations may comprise canonical create, read, update and delete (CRUD) operations. The computer readable instructions 100 may support the database operations based on an ad-hoc, tenant-defined data model. In an example, the ad-hoc nature of the data model used by the applications 110a-110n may be implemented by combining a Node.js implementation of GraphQL with additional functionality that generates the schema and/or resolvers (e.g., functions that perform database operations based on a GraphQL query) on-the-fly at runtime for each request based on each custom data model (e.g., unlike conventional GraphQL usage where the schema is defined ahead-of-time and static for all requests). The computer readable instructions 100 may combine data provided within the request (e.g. one of the apps 110a-110n and one of the decks 112a-112 to be queried against) with the data model to validate the requests, define the per-request schema, and then perform database operations against that GraphQL schema. For example, when the user makes a request the schema may be unknown. The database schema may be generated and/or constructed by the computer readable instructions 100 on-the-fly based on prior data (e.g., the data model for the decks 112a-112n and the relationships defined) to enable the apps 110a-110n to access the data model.

Figure 3:
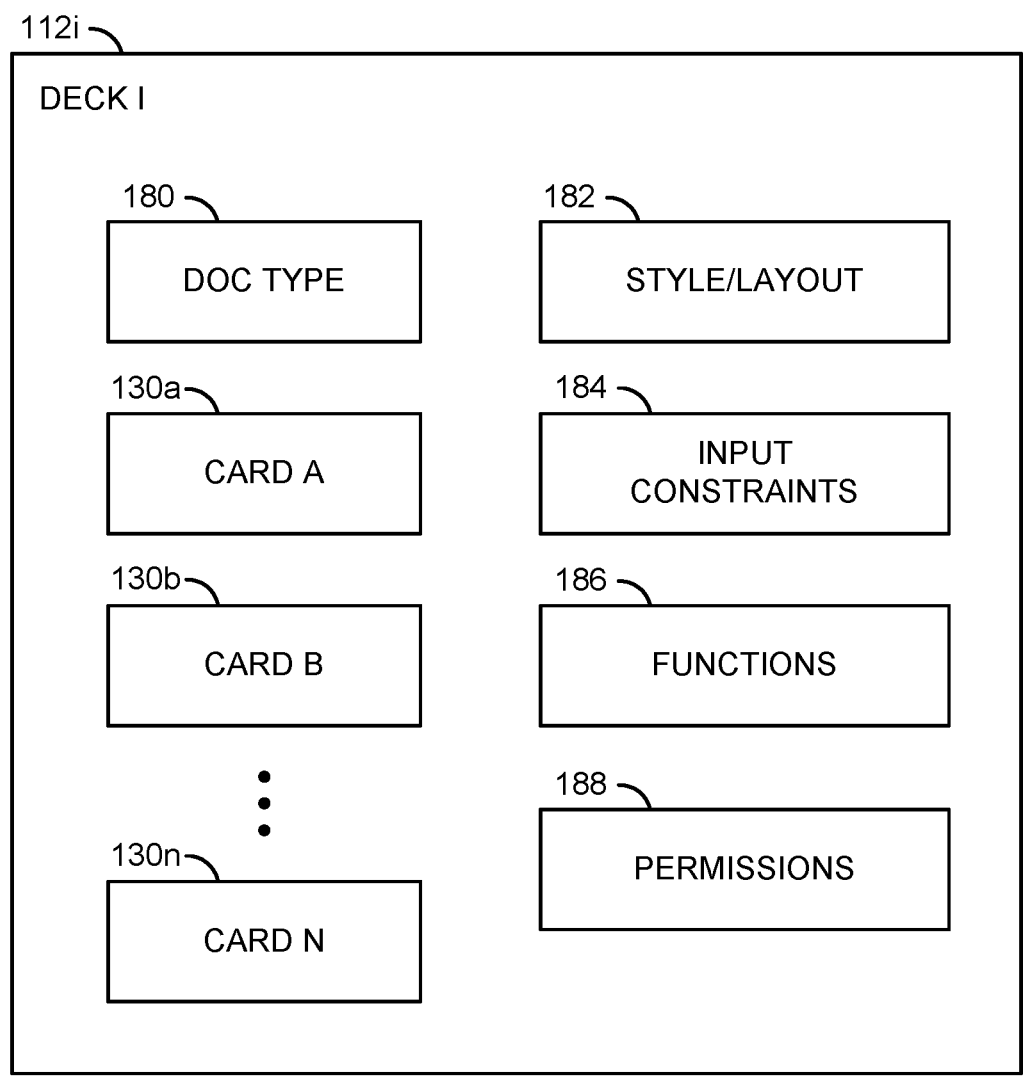
FIG. 3 is a diagram illustrating an example data model of a deck object.

Referring to FIG. 3, a diagram illustrating an example data model of the deck object 112i is shown. The deck 112i may be a representative example of one or more of the decks 112a-112n. The example deck 112i may comprise the cards 130a-130n, a block 180, a block 182, a block 184, a block 186 and/or a block 188. The block 180 may implement document type data. The block 182 may implement style/layout data. The block 184 may implement input constraints data. The block 186 may implement functions data. The block 188 may implement permissions data. The deck 112i may comprise other components (not shown). The number, type and/or functionality of the components of the decks 112a-112n may be varied according to the design criteria of a particular implementation.

The document type data 180 may comprise data (or metadata) that identifies the deck 112i. The document type data 180 may be used by the dynamic API implemented by the computer readable instructions 100 to determine relationships and/or determine how to read and/or execute the data of the deck 112i. The document type data 180 may comprise information about how the deck 112i is set up (e.g., an icon associated with the deck 112i, which apps 110a-110n the deck 112i is associated with, a data type of the deck 112i, etc.).

The style/layout data 182 may determine the design, look and/or aesthetics that may be applied to the deck 112i when displayed (e.g., viewed by a user). Generally, the style/layout data 182 may be defined based on the assumptions 104. In some embodiments, the computer readable instructions 100 may enable some customization by the user beyond the conventions provided by the assumptions 104.

The style/layout data 182 may further comprise user submitted data and/or pre-defined data applied to the deck 112i. In some embodiments, the style/layout data 182 may be selected from pre-defined sets of text based on the information in the cards 130a-130n, the data model for the deck 112i and/or the assumptions 104. In an example, if one of the data types used by the deck 112i is a date, the style/layout data 182 that may be applied may correspond to a month, day and year. In another example, if one of the data types used by the deck 112i is an amount of money, the style/layout data 182 may be determined based on a type of currency used in a particular world region.

The input constraints data 184 may apply the constraints defined by the assumptions 104 to the data that may be input. The input constraints data 184 may prevent invalid data from being submitted. The input constraints data 184 may be one type of the constraints provided by the assumptions 104. For example, if one of the data types used by the deck 112i is a date, then the input constraints data 184 may prevent data from being entered unless in a date format (e.g., MM/DD/YYYY). In another example, if one of the data types used by the deck 112i is a numeric value, then the input constraints data 184 may prevent a text string from being submitted.

The functions data 186 may be operations, formulas and/or transformations that may be applied to the data from the cards 130a-130n. The functions data 186 may be defined by a user and/or may enable relationships between input data. In an example, if one of the fields of the card 130a represents an hourly wage of an employee, and another field of the card 130 represents a number of hours worked, the functions data 186 may be a formula used to calculate the amount of money earned (e.g., hourly wage×number of hours). In another example, if the cards 130a-130n provide competitor names and race times, the functions data 186 may determine a winner of the race (e.g., sorting by lowest race time and identifying the lowest race time). In some embodiments, the assumptions 104 may provide a number of commonly used formulas as the functions data 186. The computer readable instructions 100 may generate the function data 186 for the data model of the decks 112a-112n at runtime.

The permissions 188 may define which of the users 150a-150n have permissions to access the deck 112i. In an example, the user 150a may be the administrator for the deck 112i. In another example, the user 150b may have read-only access to the data in the deck 112i. In yet another example, the user 150c may be able to edit the data in the deck 112i. The permissions 188 may be separate from the permissions and settings 116. For example, the permissions and settings 116 may define user access at a level of the applications 110a-110n. The permissions 188 may define user access at a level of the decks 112a-112n and/or the cards 130a-130n. For example, one of the decks 112i may provide addresses and may comprise cards 130a-130n that may be generally accessible by the user 150a and the user 150b. However, the user 150a may create a private card 130i corresponding to the deck 112i that may not be accessed by the user 150b (e.g., the user 150b may have access to the cards 130a-130h and the cards 130j-130n, but not have access to the private card 130i).

Figure 4:
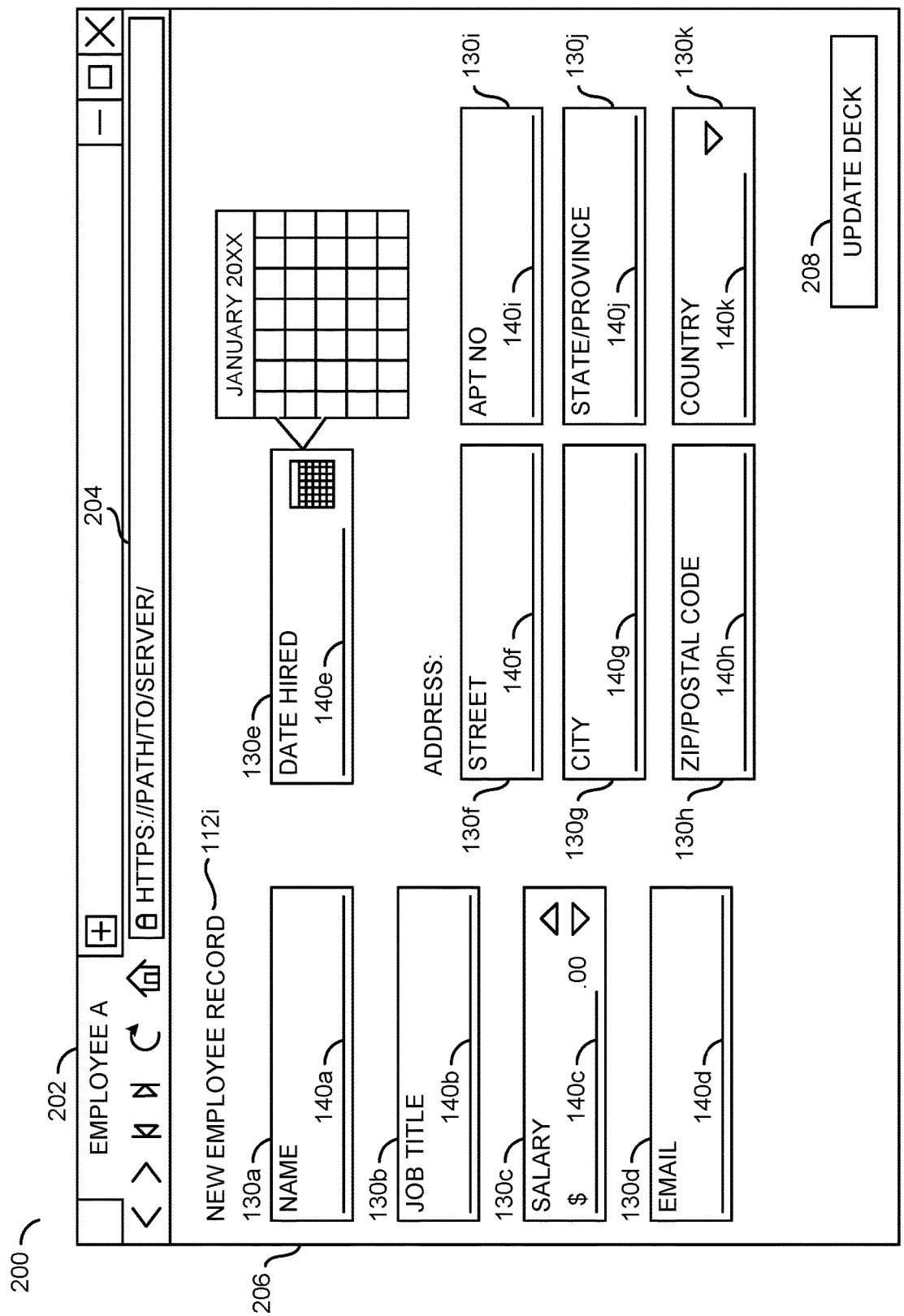
FIG. 4 is a diagram illustrating an example data input interface providing deck property input.

Referring to FIG. 4, a diagram illustrating a data input mode example 200 providing deck property input is shown. In the example shown, the data input example 200 may be shown in the context of a web browser 202 (e.g., using a desktop computing device 50a and standard computer monitor 52a). The web browser interface 202 may comprise a URL 204 (e.g., to remotely access the server 60). The website portion of the web browser 202 may comprise the data input interface 206.

The data input interface 206 may be a representative example. The various components and/or layout of the components of the data input interface 206 may be varied according to the design criteria of a particular implementation, the assumptions 104 and/or the device used to access the data input interface 206. In the example shown, the viewport of the data input interface 206 may be wide (e.g., a widescreen monitor) and the assumptions 104 may define the arrangement of the various components. As the viewport of the data input interface 206 is reduced (e.g., a window size becomes narrower, the data input interface 206 is accessed by a device with a narrower viewport, etc.) the assumptions 104 may define the graceful degradation of the layout. For example, the data input interface 206 is shown with three columns with a wide viewport, and the number of columns may be reduced as the width of the viewport is reduced. The data input interface 206 may be configured to adapt to the size (e.g., a viewport size) of the various computing devices 50a-50n (e.g., a desktop computer, a laptop computer, a smartphone, a tablet computing device, etc.).

The data input interface 206 may be generated in response to the computer readable instructions 100. The data input interface 206 may be configured to enable a user to alter the data schema to react to various user input based on the assumptions 104. For example, the data input interface 206 may be accessed by connecting to the server 60. The layout and/or design implemented by the data input interface 206 may be generated in response to the assumptions 104. The data input interface 206 may be one example of a data input mode. Generally, the data input interface 106 may be configured to receive user input. The user input received by the data input interface 106 may enable a customization of one or more objects of a data model for the applications 110a-110n.

The location for displaying objects using the data input interface 206 may be defined by the assumptions 104. For example, various objects and/or elements of the data input interface 206 may be located at locations that have been pre-defined by the assumptions 104. Different classes of objects may have different pre-defined locations.

In the data input example 200, the data input interface 206 may correspond to the deck 112i. For example, the deck 112i may enable entry of a new employee record for a human resources application. The data input interface 206 may comprise data input fields 140a-140k. The data input fields 140a-140k may define the properties for the corresponding cards 130a-130k. A button 208 is shown. The button 208 may finalize the data entry and/or modifications of the deck 112i.

In an example, the card 130a may enable the user to enter a name as the property 140a. The name property 140a may be a text (e.g., string) entry. The style/layout data 182 may define the location of the field 140a. The style/layout data 182 may apply the label 'NAME' near the field 140a. In another example, the card 130c may enable the user to enter a salary as the property 140c. The salary property 140c may be a numeric (e.g., integer) entry. The style/layout data 182 may define the location of the field 140c and/or the location of the up/down arrows (which may be used to increase/decrease the numeric value using a mouse input). The style/layout data 184 may define the currency decimal points and the dollar sign based on the assumptions 104 (e.g., a US region may use dollars).

In an example, the card 130e may enable the user to enter a date hired as the property 140e. The date hired property 140e may be a date entry. The style/layout data 182 may define the location of the field 140e. The style/layout data 182 may apply the label 'DATE HIRED' near the field 140e. The style/layout data 182 may apply an interactive calendar icon with a calendar pop-up for date selection. The input constraints data 184 may ensure that the date entered is in a compatible format. In another example, the address cards 130f-130k may enable the user to enter various address information as the properties 140f-140k. The input constraints data 184 may be configured to compare the address information entered is a proper address (e.g., a comparison to an external address database such as a USPS address database may be implemented).

Figure 5:
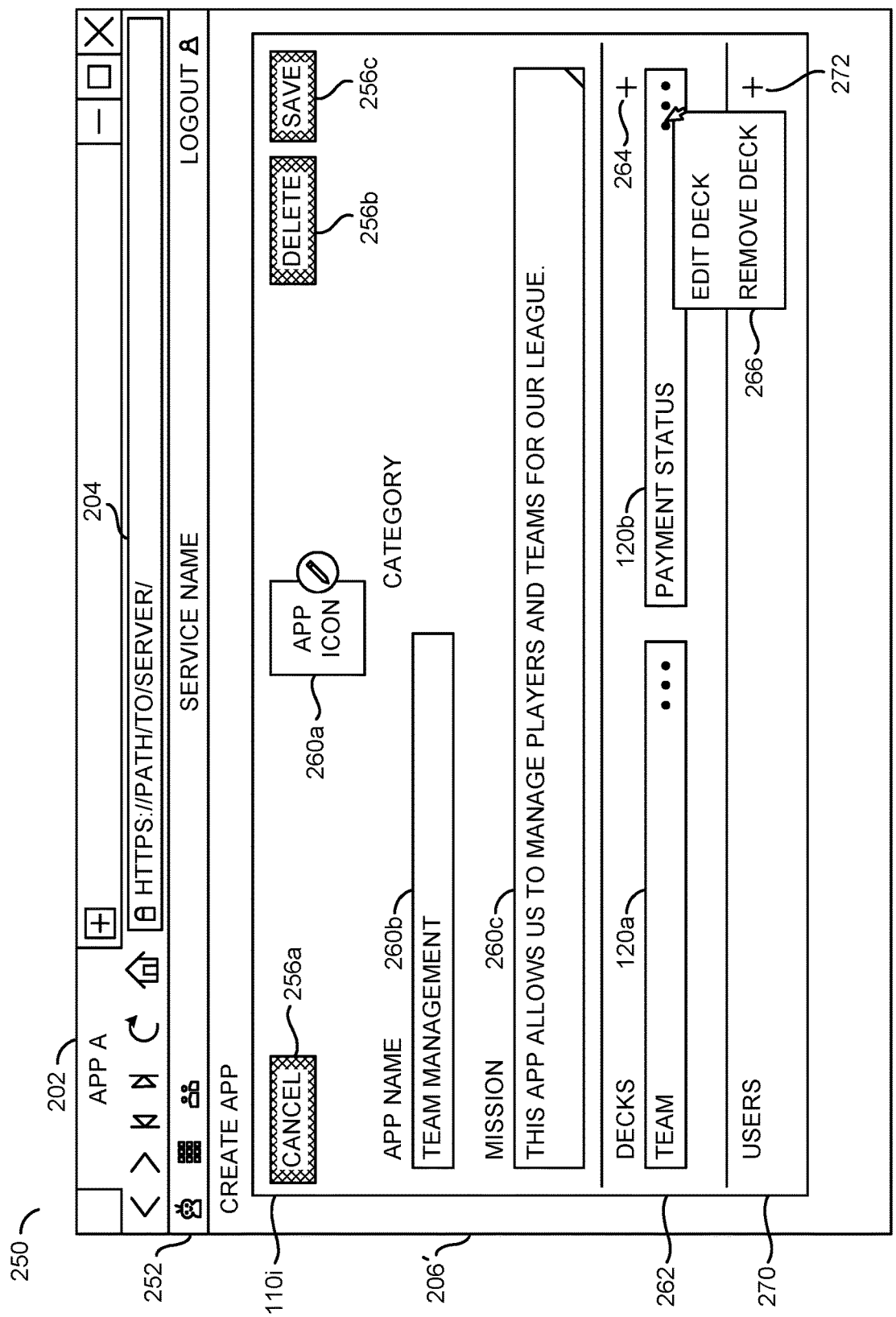
FIG. 5 is a diagram illustrating an example data input interface for creating an application.

Referring to FIG. 5, a diagram illustrating a data input example 250 for creating an application is shown. In the example shown, the data input example 250 may be shown in the context of the web browser 202. A titlebar 252 is shown. For example, the titlebar 252 may be persistent across various interfaces of the computer readable instructions 100 and provide commonly used links, information and/or features (e.g., a link to a user profile, a title of the service, a link to an app selection interface, a logout link, etc.).

The data input interface 206' is shown. The data input interface 206' may enable the creation of the app 110i. The data input interface 206' may enable the user to set up and/or define the data model for the app 110i.

Buttons 256a-256c are shown. For example, the button 256a may cancel modifications to the app 110i, the button 256b may delete the app 110i and the button 256c may save modifications made to the app 110i. Identification options 260a-260c are shown on the data input interface 206'. The identification option 260a may enable a user to select an icon to associate with the app 110i. The identification option 260b may enable the user to input a name to identify the app 110i. The identification option 260c may enable the user to input a mission statement and/or description for the app 110i. Generally, the identification options 260a-260c may not affect the functionality of the app 110i and merely offer decoration and/or provide ease in finding the app 110i (e.g., from a list of the apps 110a-110n). In the example shown, the app 110i may be a sports team management app.

The data interface 206' may comprise a deck association section 262. The deck association section 262 may enable the user to define the decks 120a-120n that may be associated with the app 110*i*. Associating the decks 120*a*-120*n* may provide the database schema and/or the data model of the app 110*i*. A button 264 is shown. The button 264 may add one of the decks 120*a*-120*n* to the app 110*i*.

In the example shown, the deck 120*a* and the deck 120*b* are shown. The deck 120*a* may define a team deck. The deck 120*b* may define a payment status deck. A sub-menu 266 is shown. The sub-menu 266 may provide options for modifying the associated decks 120*a*-120*n*. In the example shown, the sub-menu 266 may enable a user to edit and/or remove the associated deck 120*b*. Details about modifying the associated decks 120*a*-120*n* may described in association with FIG. 6.

The data interface 206' may comprise a user association section 270. The user association section 270 may be used to enable and/or prevent one or more of the users 150*a*-150*n* to access the app 110*i*. A button 272 is shown. The button 272 may be used to add a new user. In the example shown, the app 110*i* may not have any users defined. Generally, the user creating the app 110*i* may be the administrator user.

Figure 6:
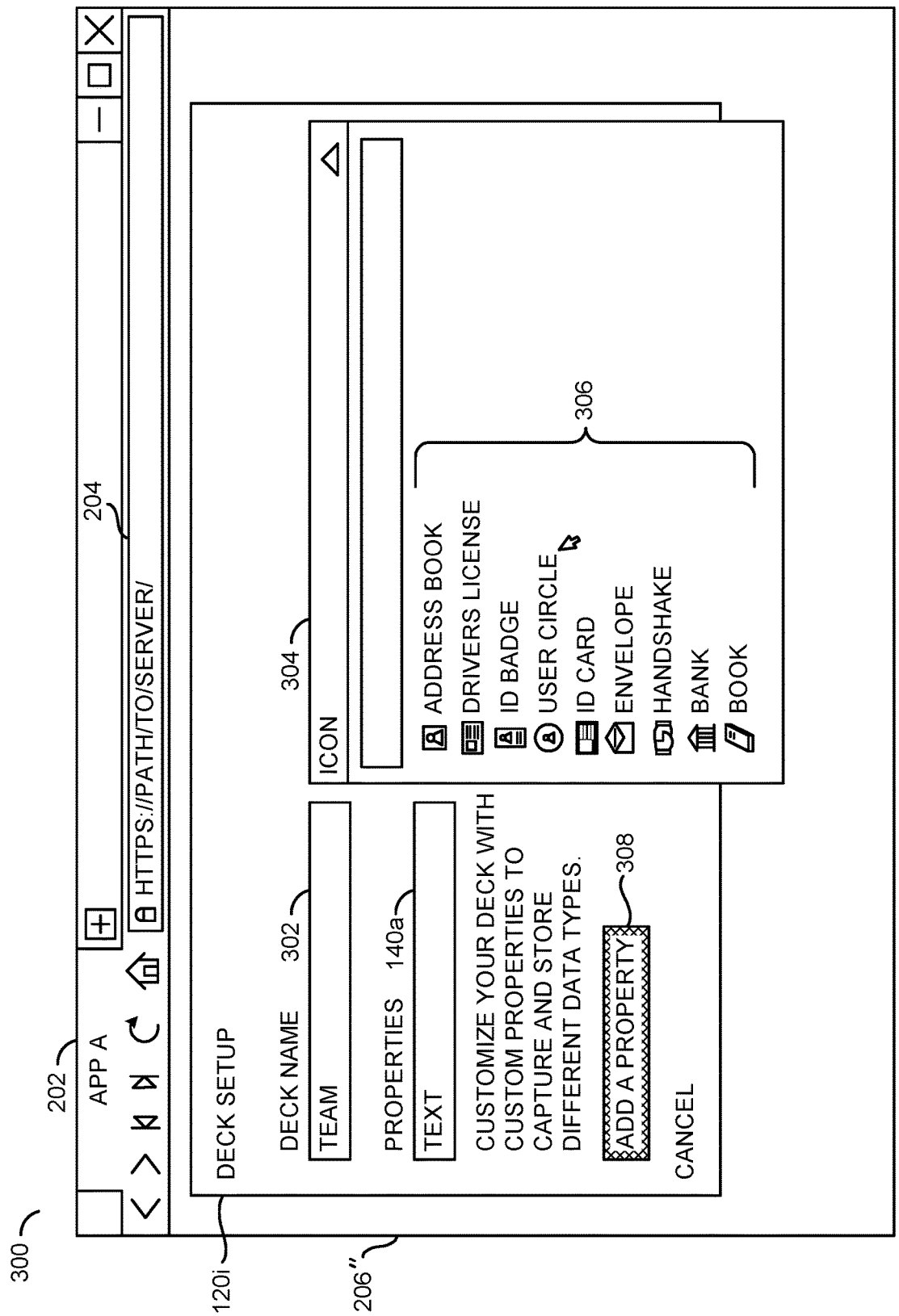
FIG. 6 is a diagram illustrating an example data input interface for defining a deck.

Referring to FIG. 6, a diagram illustrating a data input example 300 for defining a deck is shown. In the example shown, the data input example 300 may be shown in the context of the web browser 202. Options for modifying the deck 120*i* are shown within the data input interface 206". In one example, the data input interface 206" may enable modifying the deck 120*i* when the user interacts (e.g., clicks, taps, etc.) with the button 264 (e.g., to associated a new deck with the app 110*i*) shown in association with FIG. 5. In another example, the data input interface 206" may enable modifying the deck 120*i* when the user interacts with the edit deck option on the menu 266 associated with the deck shown in association with FIG. 5.

The data input interface 206" may enable a modification and/or initialization of a data model for the deck 120*i*. A deck name 302 may be input by the user. A deck icon 304 may be selected by the user. The deck icon 304 may be selected from a number of pre-defined icons 306. The pre-defined icons 306 may correspond to common categories and/or data types for the decks 120*a*-120*n*. The deck name 302 and/or the deck icon 304 may be implemented to enable a user to quickly identify the deck 120*i* from a list of associated decks 120*a*-120*n* when using the applications 110*a*-110*n*.

The property 140*a* is shown associated with the deck 120*i*. The data input interface 206" may enable the user to add the properties 140*a*-140*n* to the deck 120*i*. In the example shown, the property 140*a* may have a text data type. A button 308 may be used to add a next property (e.g., interacting with the button 308 may add the property 140*b*, then the property 140*c*, then the property 140*d*, etc.). The properties 140*a*-140*n* added to the deck 120*i* may modify the data model for the deck 120*i*.

Figure 7:
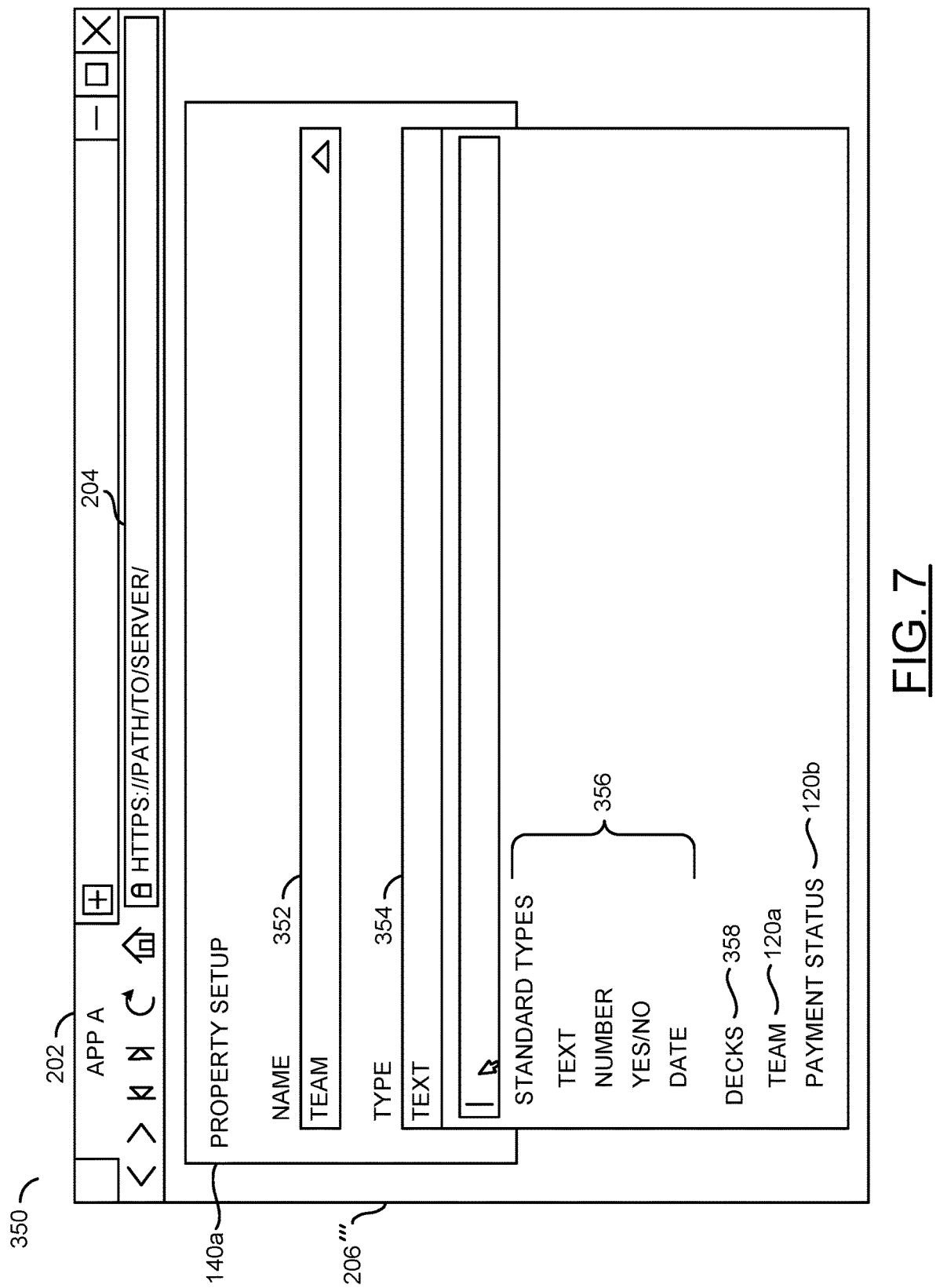
FIG. 7 is a diagram illustrating an example data input interface for defining properties of a deck.

Referring to FIG. 7 a diagram illustrating a data input example 350 for defining properties of a deck is shown. In the example shown, the data input example 350 may be shown in the context of the web browser 202. Options for defining the properties 140*a*-140*n* (e.g., associated with the deck 120*i*) are shown within the data input interface 206'''. In an example, the data input interface 206''' may enable modifying properties 140*a*-140*n* associated with the deck 120*i* when the user interacts with the button 308 (e.g., to associate a new property with the deck 120*i*) shown in association with FIG. 6.

The data input interface 206''' may enable a modification and/or initialization of a data model for the deck 120*i*. The property 140*a* may be a portion of the data model for the deck 120*i*. In the example shown, the data input interface 206''' may enable the modification of the property 140*a*.

The data input interface 206''' for modifying the properties 140*a*-140*n* may enable the user to input a property name 352. In the example shown, the property name 352 for the property 140*a* associated with the deck 120*i* may be 'TEAM'. The data model for the deck 120*i* may be modified on-the-fly to have the property 140*a* with the property name 352.

The data input interface 206''' for modifying the properties 140*a*-140*n* may enable the user to select a property type 354. In the example shown, the property type 354 for the property 140*a* associated with the deck 120*i* may be a text data type. The data model for the deck 120*i* may be modified on-the-fly to have the property 140*a* with the property name 352 having the property type 354.

The assumptions 104 may pre-define a number of standard property types 356. In the example shown, the standard property types 356 may comprise a text data type, a number data type, a Boolean data type (e.g., yes/no and/or true/false) and/or a date data type. Other standard property types 356 may be available (e.g., time, percentage, etc.). The properties 140*a*-140*n* may also be defined as a deck property type 358. One of the decks 120*a*-120*n* may be selected as the property type 354. In the example shown, the app 110*i* may have the deck 120*a* (e.g., team) and the deck 120*b* (e.g., payment status) available as options for the property type 354.

Generally, the user may select one property type 354 from the standard types 356 and the deck property types 358. As more decks 120*a*-120*n* are added, the number of options for a property type 354 may be increased. Defining a property as one of the deck property types 358 may pre-populate a list of options when defining one of the cards 130*a*-130*n*. For example, if the property type 354 is defined as the team deck 120*a*, the list of teams may be pre-populated as options when defining the cards 130*a*-130*n*. Details of defining the cards 130*a*-130*n* may be described in association with FIG. 9.

Figure 8:
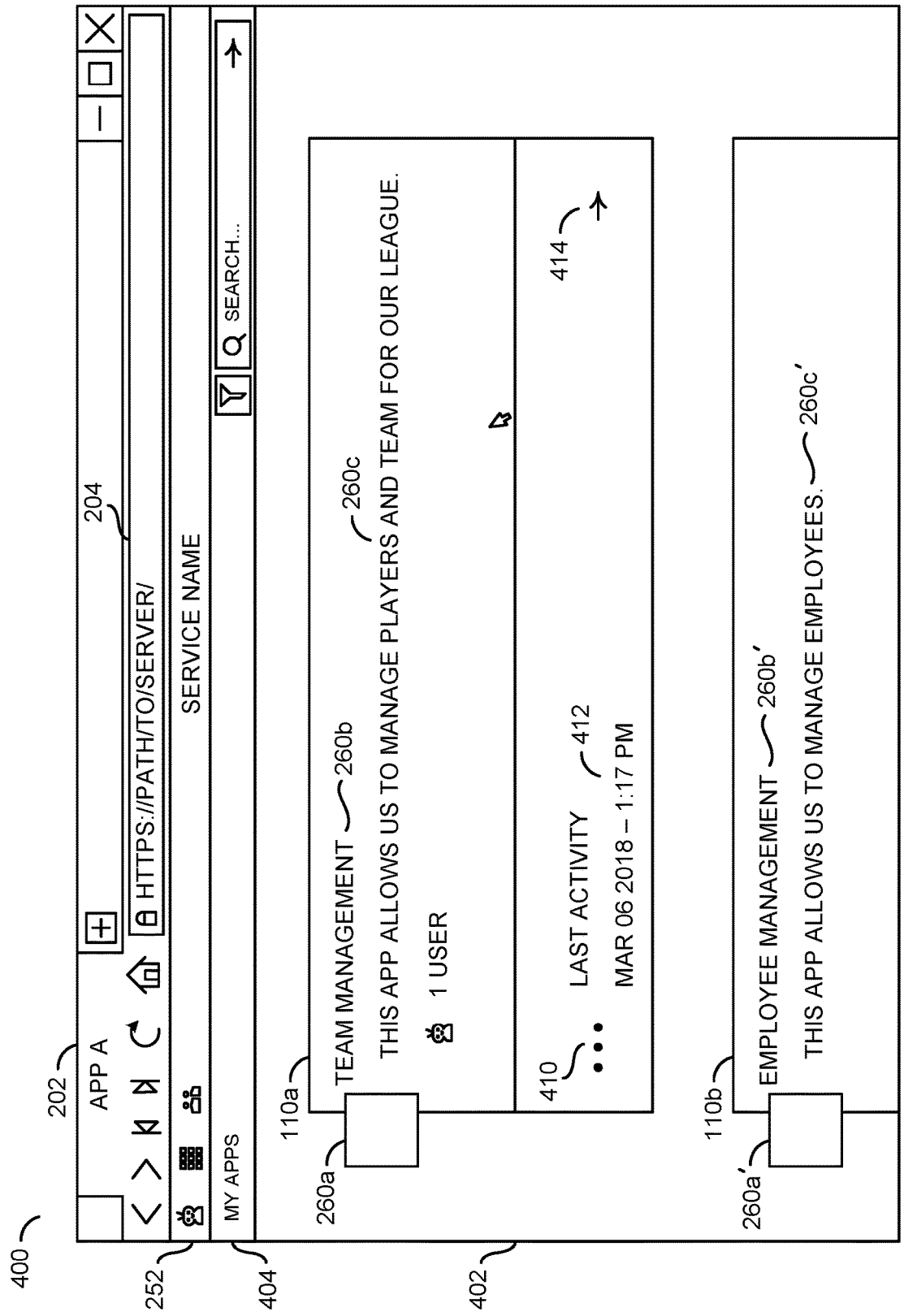
FIG. 8 is a diagram illustrating an example application selection interface.

Referring to FIG. 8, a diagram illustrating an application selection example 400 of an application interface is shown. The application selection example 400 may be shown in the context of the web browser 202. The titlebar 252 is shown (e.g., persistent across various interfaces of the computer readable instructions 100). An application interface (or database interface) 402 is shown in the website portion of the web browser 202.

The application interface 402 may be generated in response to the computer readable instructions 100. The application interface 402 may enable a user to interact with the applications 110*a*-110*n* using the computing devices 50*a*-50*n*. For example, the application interface 402 may be accessed by connecting to the server 60. The layout and/or design implemented by the application interface 402 may be generated in response to the assumptions 104. The application interface 402 may be one example of a database interface. The application interface 402 may enable the users 150*a*-150*n* to access the database 102.

The location for displaying objects using the application interface 402 may be defined by the assumptions 104. For example, various objects and/or elements of the application interface 402 may be located at locations that have been pre-defined by the assumptions 104. Different classes of objects may have different pre-defined locations. The application interface 402 may be accessible from the various computing devices 50*a*-50*n*. The application interface 402 may be configured to adapt to a screen size (or viewport) of the various types of computing devices 50a-50n (e.g., a desktop computer, a laptop computer, a smartphone, a tablet computing device, etc.).

The application interface 402 may have a navigation bar 404. The navigation bar 404 may have a title (e.g., my apps) and a search and/or filter feature. The search and/or filter feature may enable a user to find a particular one of the apps 110a-110n.

In the application selection example 400, the application interface 402 may provide a list of the apps 110a-110n. For example, the list of the apps 110a-110n may provide a brief overview and/or summary of each of the apps 110a-110n (e.g., to help the user find the desired app).

In the example shown, a listing for the app 110a and a partial listing for the app 110b are shown on the application interface 402. The app icon 260a, the app name 260b and/or the app description 260c are shown for the app 110a. The app icon 260a', the app name 260b' and the app description 260c' are shown for the app 110b.

For the app 110a, edit options 410, activity data 412 and/or a selection button 414 are shown. The edit options 410 may enable the user to modify the app 110a using the data input interface 206' (shown in association with FIG. 5). In an example, the edit options 410 may be available if the user has administrator privileges defined in the permissions and settings 116 (e.g., may not be visible to all of the users 150a-150n). The activity data 412 may indicate the last time the app 110a has been accessed by a user. The selection button 414 may enable a user to select the app 110a. The application interface 402 may be updated to display the contents of the app 110a in response to the selection button 414. In an example, the selection button 414 may be available if the user has at least read privileges. Each of the listings for the apps 110a-110n displayed by the application interface 402 may comprise similar content to enable users to modify and/or select a desired one of the apps 110a-110n.

Figure 9:
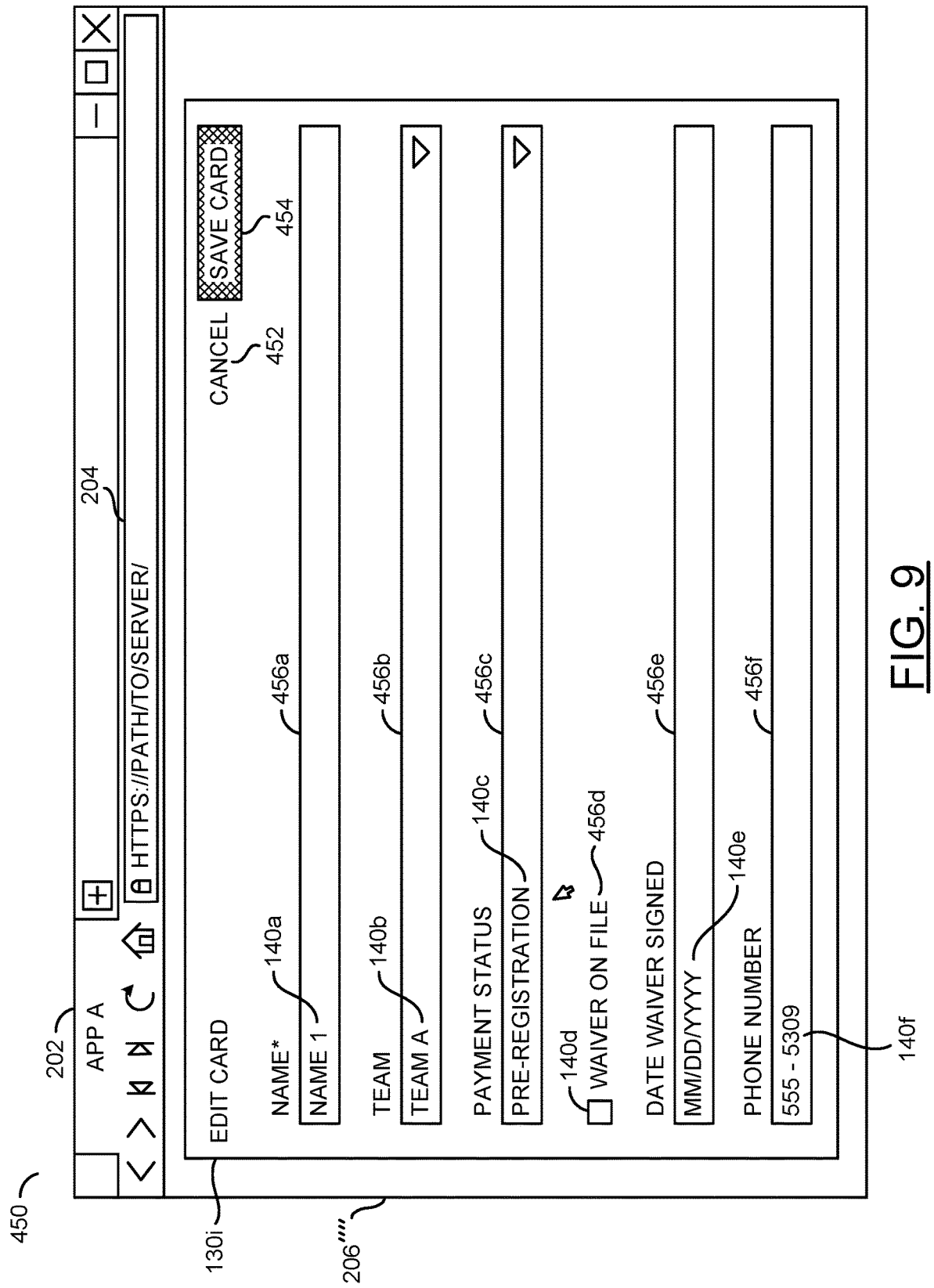
FIG. 9 is a diagram illustrating an example data input interface for card data entry.

Referring to FIG. 9, a diagram illustrating an example data input interface for a card data entry 450 is shown. The data input interface example 450 may be shown in the context of the web browser 202. Options for modifying, creating and/or editing the card 130i are shown within the data input interface 206''''. A similar data input interface 206'''' may be implemented for modifying each of the cards 130a-130n.

The data input interface 206'''' may be generated in response to the computer readable instructions 100, the information stored in the database 102 and/or the assumptions 104. In an example, the data input interface 206'''' may enable modifying the properties 140a-140n associated with the card 130i that have been defined for the deck 120i as shown in association with FIG. 6 and FIG. 7. The data input interface 206'''' may be generated according to the defined deck 120i. For example, the data input interface 206'''' for editing and/or creating the card 130i may be a template generated according to the object structure of the deck 120i.

A button 452 and a button 454 are shown. The button 452 may cancel creating and/or editing the card 130i. The button 454 may save the card 130i. For example, when the user interacts (e.g., clicks, taps, etc.) the button 454, the card 130i may be added to the deck 120i. The information of the card 130i (e.g., the properties 140a-140n) may be used to perform the database operations (e.g., search, filter, print, export, etc.).

The data input interface 206'''' may comprise a number of inputs 456a-456f. The inputs 456a-456f may enable a user to enter data corresponding to the properties 140a-140f. In the example shown, the deck 120i may comprise six different properties for a player registration for a sports team management app. For example, the property 140a may be a player name and the input 456a may be a text input, the property 140b may be a team name and the input 456b may be a drop-down menu (e.g., to select from a number of pre-defined team names, which may be defined by the decks 120a-120n), the property 140c may be a payment status and the input 456c may be a drop-down menu (e.g., to select from a number of pre-defined payment statuses), the property 140d may be whether the player has signed a waiver and the input 456d may be a checkbox input (e.g., a Boolean input), the property 140e may be a date and the input 456e may be a date input and/or the property 140f may be a phone number and the input 456f may be a text input having a particular format (e.g., an area code and seven digits). For example, the types of the inputs 456a-456f may correspond to the standard property types 356 and/or the deck property types 358 shown in association with FIG. 7. For example, the pre-defined teams for the property 140b may be determined based on the available team cards 130a-130n corresponding to a team deck (e.g., the deck 120a). The number of properties 140a-140n and/or the types of inputs 456a-456n may be varied according to the design criteria of a particular implementation.

Figure 10:
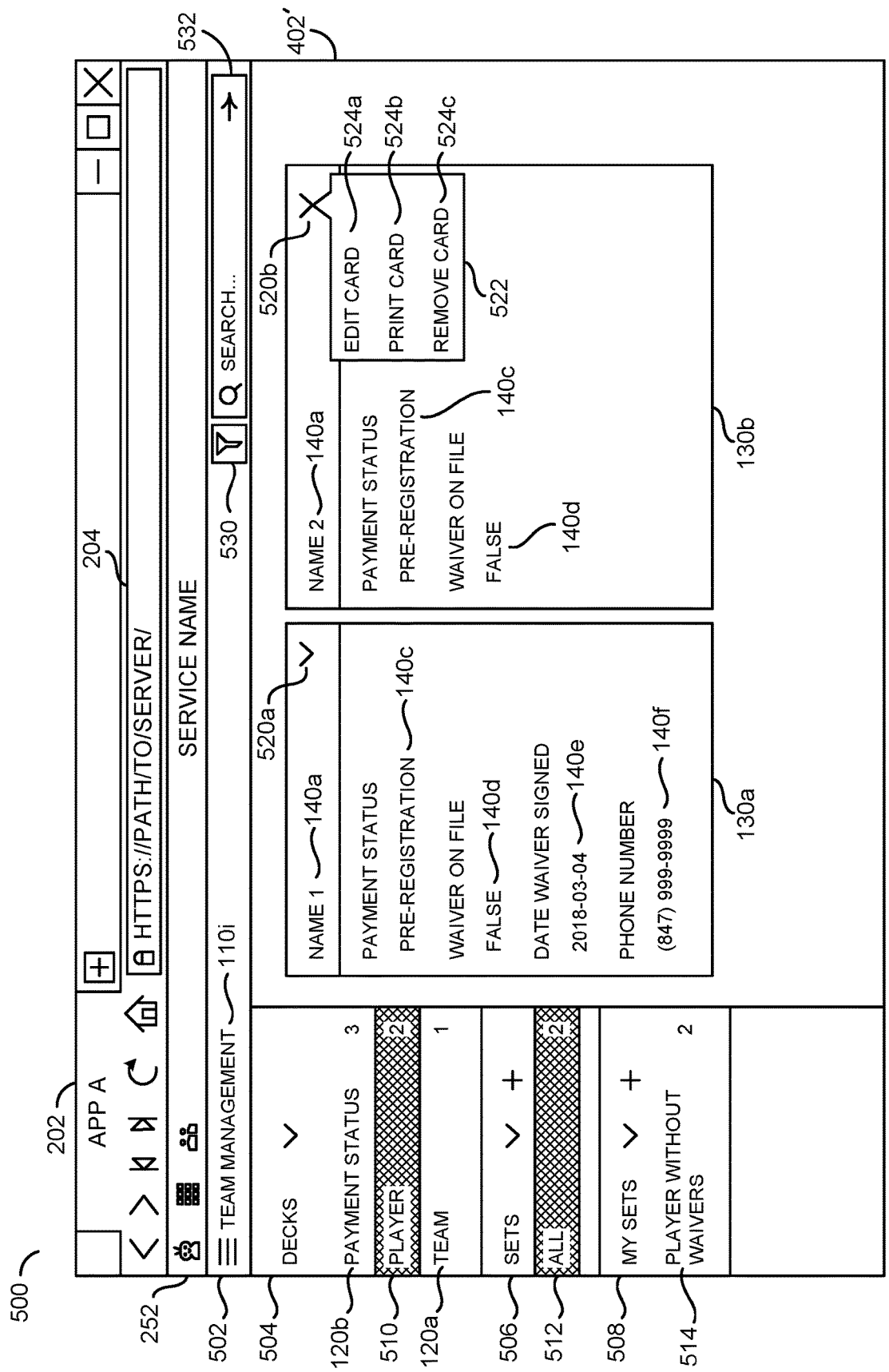
FIG. 10 is a diagram illustrating an example application interface displaying cards associated with a deck.

Referring to FIG. 10, a diagram illustrating an application interface example 500 displaying cards associated with a deck is shown. The application interface example 500 displaying cards associated with a deck may be shown in the context of the web browser 202. The titlebar 252 is shown (e.g., persistent across various interfaces generated by the computer readable instructions 100). The application interface (or database interface) 402' is shown in the website portion of the web browser 202.

The application interface 402' may be generated in response to the computer readable instructions 100. The application interface 402' may comprise an app menu bar 502, a deck list 504, a set list 506 and/or custom set list 508. The app menu bar 502 may display the name of the app 110i. The application interface 402' is shown displaying a number of cards (e.g., 130a-130b, in the example shown) associated with the app 110i.

The deck list 504 may comprise a number of decks (e.g., 120a-120n) associated with the app 110i. The set list 506 may comprise a number of sets. In an example, the sets available in the set list 506 may be pre-defined filters for the cards 130a-130n associated with the decks 120a-120n. The custom set list 508 may comprise a number of sets. In an example, the sets available in the custom set list 508 may be stored sets defined by the user.

In the example shown, the deck list 504 may comprise the deck 120a (e.g., teams), a deck 120b (e.g., payment status) and a selected deck 510. The selected deck 510 may correspond to 'players'. The cards 130a-130b shown on the application interface 402' may correspond to the selected deck 510. For example, the cards 130a-130b may represent cards stored in the database 102 corresponding to players associated with the app 110i. A number is shown beside each of the decks 120a-120b and the selected deck 510. The number may indicate the number of cards 130a-130n in each of the available decks. In the example shown, the selected deck 510 may comprise two cards.

In the example shown, the set list 506 may comprise the selected set 512. The selected set 512 may comprise the pre-defined set of ALL (e.g., display all cards 130a-130n corresponding to the selected deck 510). The computer readable instructions 100 may be executed to perform various database operations based on the definitions of the selected set 512. In the example shown, the database operations may comprise a filter and/or query to find all the cards 130*a*-130*n* associated with the selected deck 510 stored in the database 102.

In the example shown, the custom set list 508 may comprise the custom set 514. For example, the custom set 514 may be a user-defined set of 'players without waivers'. In the example shown, the custom set 514 is not selected (e.g., the selected set 512 corresponding to ALL has been selected). In an example, if the user-defined set 514 were selected by the user, the computer readable instructions 100 may be executed to perform various database operations based on the definitions of the user-defined set 514. In the example shown, the database operations may comprise a filter and/or query to find the cards 130*a*-130*n* associated with the app 110*i* and corresponding to the selected deck 510 that have a false value for the property 140*d*. The user-defined set 514 may enable the user to define the search/filter and save the definitions for later (e.g., for convenience the user may want to have quick access to the user-defined set 514). The types of definitions of the user-defined sets may be varied according to the design criteria of a particular implementation.

The cards 130*a*-130*b* corresponding to the selected deck 510 are shown on the application interface 402'. In the example shown, the application interface 402' may display the cards 130*a*-130*b* in a block view. The block view may list the properties 140*a*-140*n* of each of the cards 130*a*-130*n* as a window (or block) of information.

In the example shown, the cards 130*a*-130*b* may each have a corresponding button 520*a*-520*b*. Interacting with the buttons 520*a*-520*b* may generate more options. In the example shown, a sub-menu 522 is shown extending below the button 520*b*. The sub-menu 522 may provide various database operations 524*a*-524*c*. For example, the database operations 524*a*-524*c* may enable the properties of the cards 130*a*-130*b* to be modified, printed and/or deleted. In one example, the data input interface 206'''' for modifying the card 130*b* may be enabled when the user interacts (e.g., clicks, taps, etc.) with the button 524*a* (e.g., as shown in association with FIG. 9).

The app menu bar 502 may comprise a button 530 and a search box 532. The button 530 may implement a filter button. The search box 532 may implement a search of the cards 130*a*-130*b*. In an example, interacting with the filter button 530 may enable a data input interface for defining filtering options. For example, the filter button 530 may allow the user to customize the user-defined set 514. The search box 532 may enable the user to initiate a search database operation. For example, the search may comprise looking for matches between a search term input by a user and the decks 120*a*-120*n* and/or the properties 140*a*-140*n* corresponding to the app 110*i*. The search database operation may return all the cards 130*a*-130*n* that have a property value matching the search term.

Figure 11:
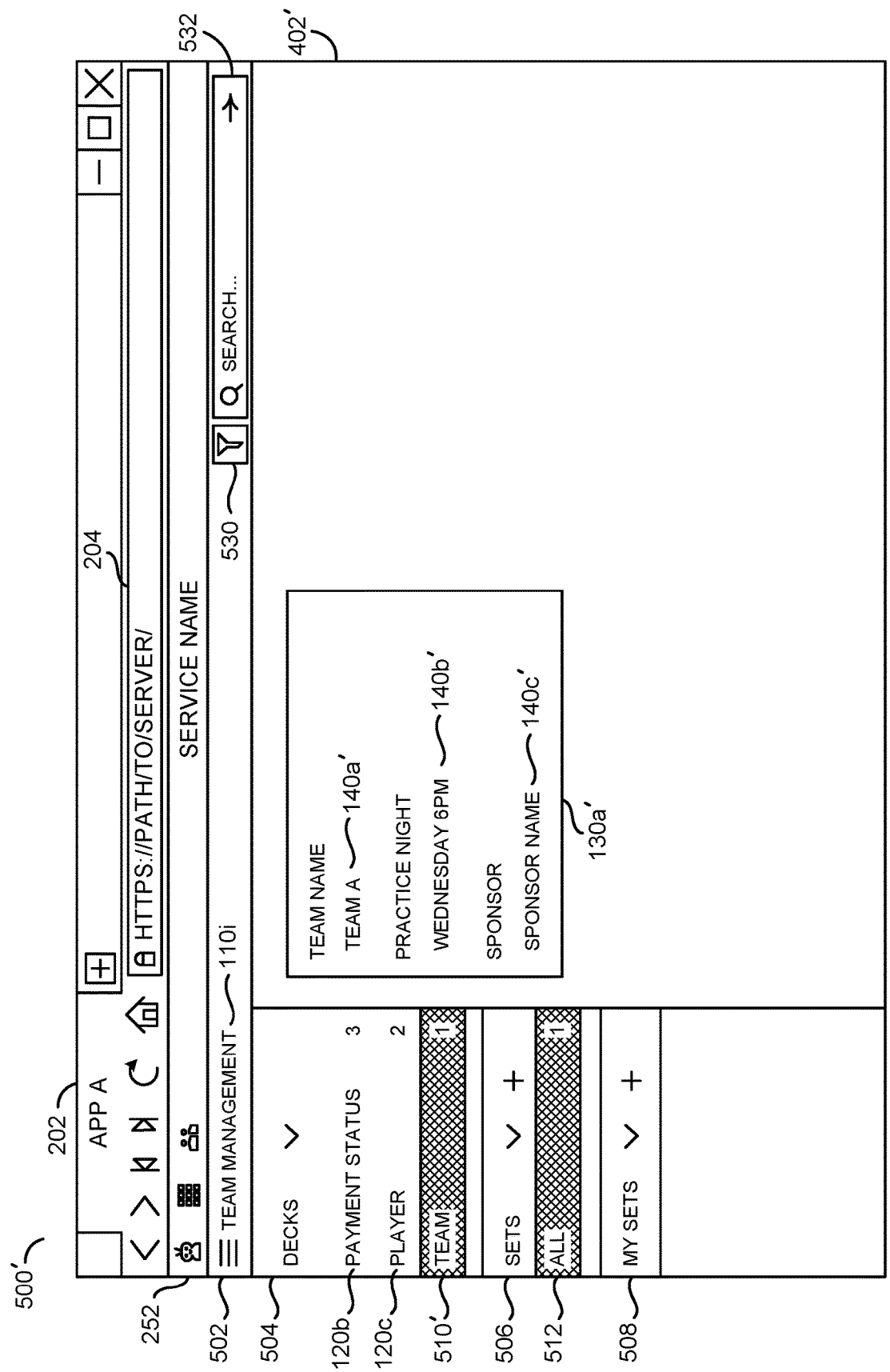
FIG. 11 is a diagram illustrating an alternate example application interface displaying cards associated with a deck.

Referring to FIG. 11, a diagram illustrating an alternate application interface example 500' displaying cards associated with a deck is shown. The alternate application interface example 500' displaying cards associated with a deck may be shown in the context of the web browser 202. The titlebar 252 is shown (e.g., persistent across various interfaces generated by the computer readable instructions 100). The application interface (or database interface) 402' is shown in the website portion of the web browser 202.

The application interface 402' may comprise the app title bar 502, the deck list 504, the set list 506 and the custom set list 508. In the example shown, the deck 120*c* (e.g., corresponding to 'PLAYERS') may no longer be selected. The selected deck 510' may correspond to a deck for 'TEAM' (e.g., the deck 120*a* shown in association with FIG. 10). By selecting different decks 120*a*-120*n* from the deck list 504, the computer readable instructions 100 may be executed to perform database operations to retrieve the cards 130*a*-130*n* from the database 102 corresponding to the deck selected by the user.

The card 130*a*' shown on the application interface 402' may correspond to the selected deck 510'. Since the selected set 512 defines all the cards associated with the selected deck 510', the selected deck 510' may comprise one card. The properties 140*a*'-140*c*' associated with the card 130*a*' are shown on the application interface 402'.

Figure 12:
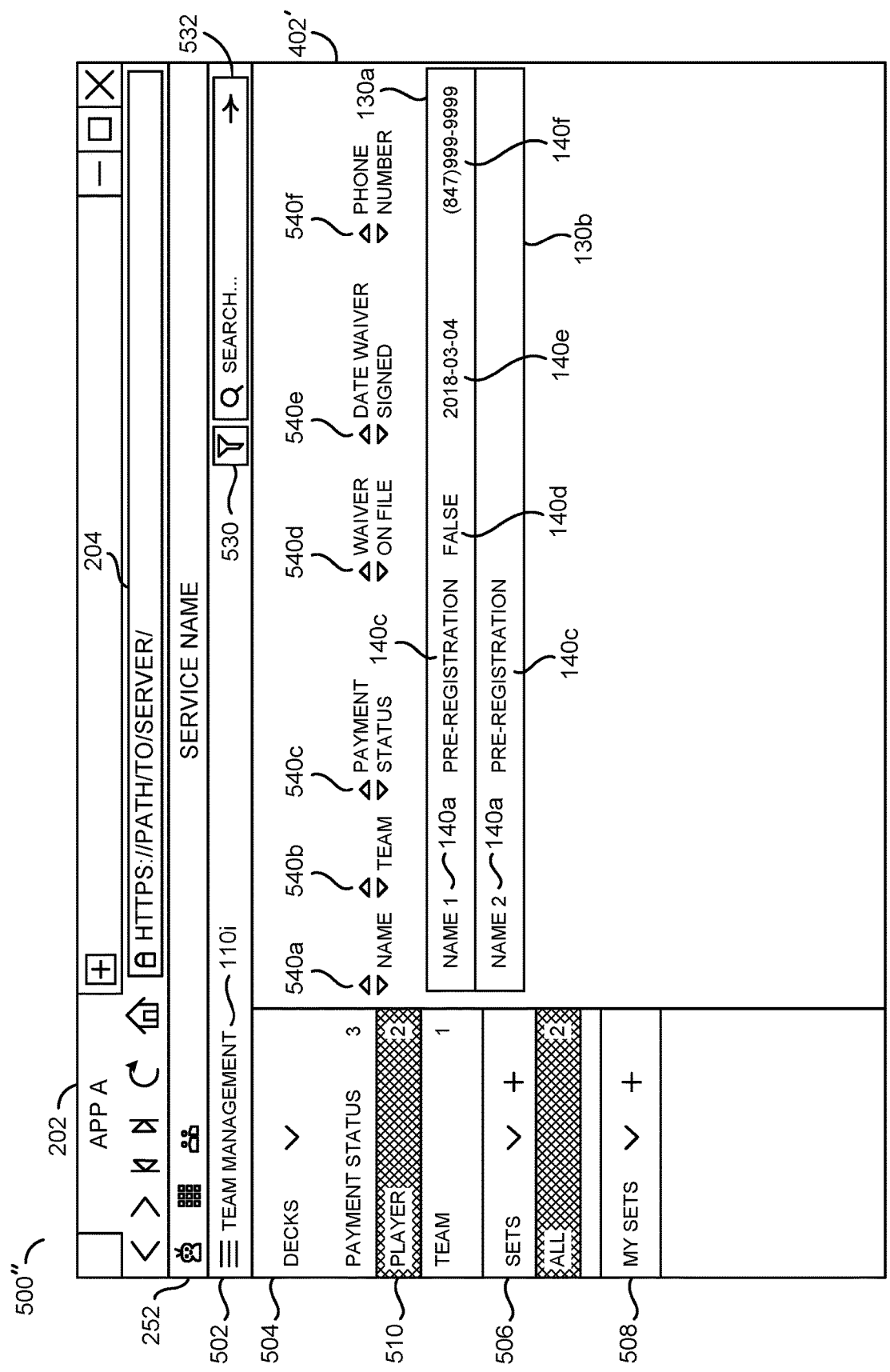
FIG. 12 is a diagram illustrating an example application interface displaying an alternate listing of cards associated with a deck.

Referring to FIG. 12, a diagram illustrating an application interface example 500'' displaying an alternate listing of cards associated with a deck is shown. The application interface example 500'' displaying an alternate listing of cards associated with a deck may be shown in the context of the web browser 202. The titlebar 252 is shown (e.g., persistent across various interfaces generated by the computer readable instructions 100). The application interface (or database interface) 402' is shown in the website portion of the web browser 202.

The application interface 402' may comprise the app title bar 502, the deck list 504, the set list 506 and the custom set list 508. In the example shown, the selected deck 510 may correspond to 'PLAYERS' (similar to the example 500 shown in association with FIG. 10). The cards 130*a*-130*b* may be displayed by the application interface 402'.

In the example shown, the application interface 402' may display the cards 130*a*-130*b* in a list view. The list view may display the properties 140*a*-140*n* of each of the cards 130*a*-130*n* as on separate horizontal lines. For example, the list view may provide a more condensed view than the block view shown in association with FIG. 10.

Buttons 540*a*-540*f* are shown above the cards 130*a*-130*b*. Each of the buttons 540*a*-540*f* may correspond to one of the properties 140*a*-140*f* of the cards 130*a*-130*b*. The buttons 540*a*-540*f* may be configured to initiate database operations to sort the cards 130*a*-130*b* based on the properties 140*a*-140*f*. In one example, the buttons 540*a*-540*f* may be configured to sort the cards 130*a*-130*b* in ascending or descending order according to the properties 140*a*-140*f*. For example, if the user interacts with the button 540*a*, the database operations may be performed to sort the cards 130*a*-130*b* in a descending alphabetical order by name (e.g., the property 140*a*).

Figure 13:
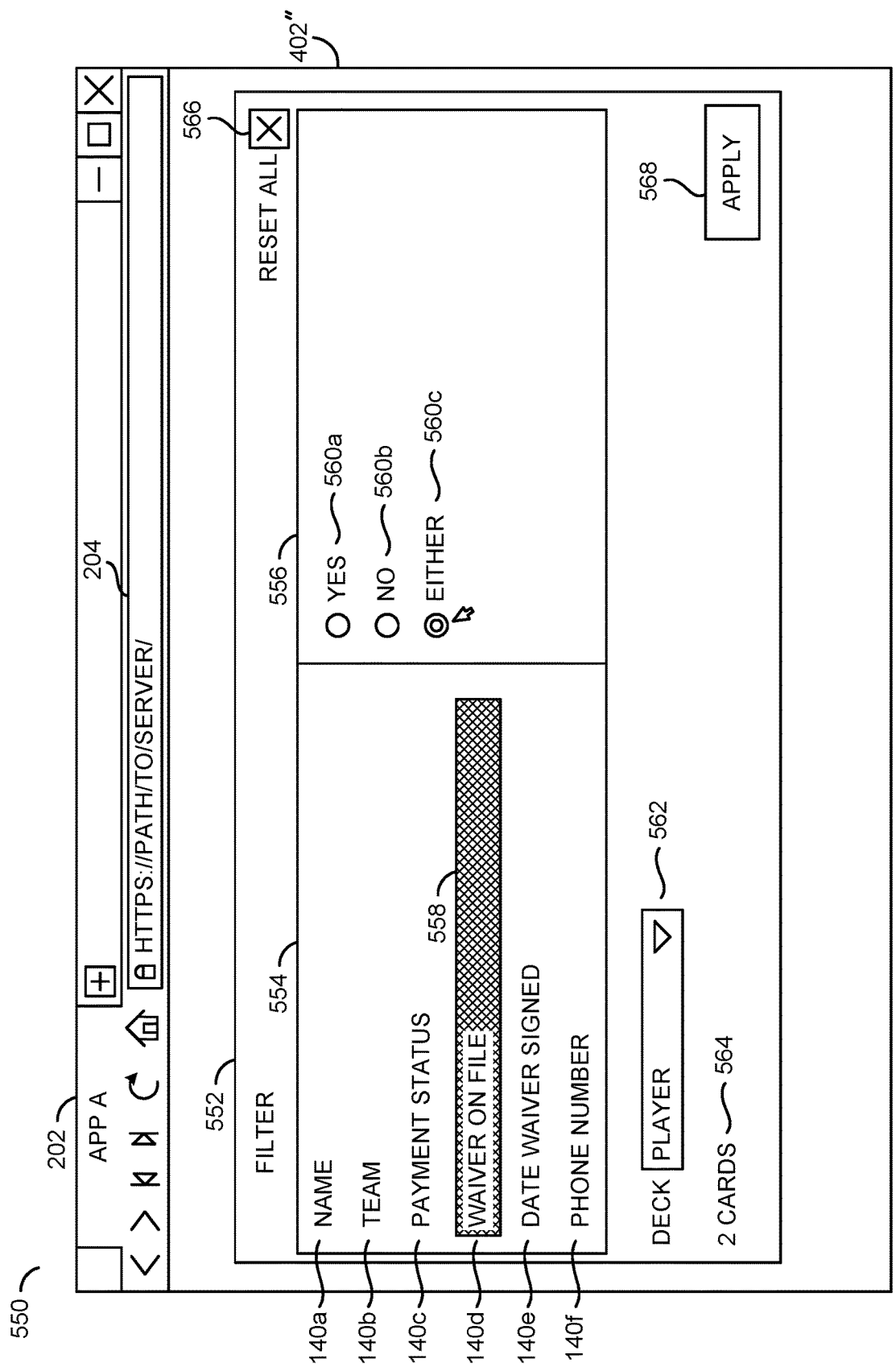
FIG. 13 is a diagram illustrating an example application interface displaying filter settings.

Referring to FIG. 13, a diagram illustrating an application interface example 550 displaying filter settings is shown. The example application interface 550 displaying filter settings may be shown in the context of the web browser 202. The application interface example 550 may generated in response to the computer readable instructions 100. The application interface (or database interface) 402'' is shown in the website portion of the web browser 202.

A dialog box 552 is shown on the application interface 402''. The dialog box 552 may be a filter customization window overlaid on the application interface 402''. In an example, the dialog box 552 may be opened in response to the user interacting with the button 530 (shown in association with FIGS. 10-12). The dialog box 552 may be configured to enable the user to apply various filters to the decks 120*a*-120*n* and/or cards 130*a*-130*n* of the apps 110*a*-110*n*. The filtering may be one of the database operations implemented using the computer readable instructions 100.

The filter dialog box 552 may comprise a property filter menu 554 and a filter options menu 556. The property filter menu 554 may comprise a list of the properties 140a-140f corresponding to a selected deck. A user may select one of the properties 140a-140f in the property filter menu 554 to create a filter (e.g., for the cards 130a-130n in the selected deck). In the example shown, the property 140d may be the selected property 558.

The filter options menu 556 may display filtering options corresponding to the selected property 558. Filter options 560a-560c are shown in the filter options menu 556. Since the selected property 558 is a Boolean property, only three filter options 560a-560c may be available (e.g., yes, no, and either). The filter options 560a-560c may change in response to the selected property 558. For example, if the selected property 558 was the property 140e (e.g., a date input), the filter options 560a-560n may be date options (e.g., date ranges). The filter options generated may be varied according to the design criteria of a particular implementation.

The filter dialog box 552 may comprise a deck selection input 562. The property filter menu 554 may be populated in response to the deck selected by the deck selection input 562. For example, the property filter menu 554 may populate each of the properties 140a-140n corresponding to the deck selected with the deck selection input 562. A total cards indicator 564 is shown. The total cards indicator 564 may display the total number of cards associated with the deck selected with the deck selection input 562.

The filter dialog box 552 may comprise a button 566 and/or a button 568. The button 566 may close the filter dialog box 552 and/or reset the filters applied by the user. The button 568 may apply the filters selected by the user to the selected deck. In some embodiments, the filter dialog box 552 may comprise a save option to enable the user to save the selected filters as one of the user-customized sets 514.

Figure 14:
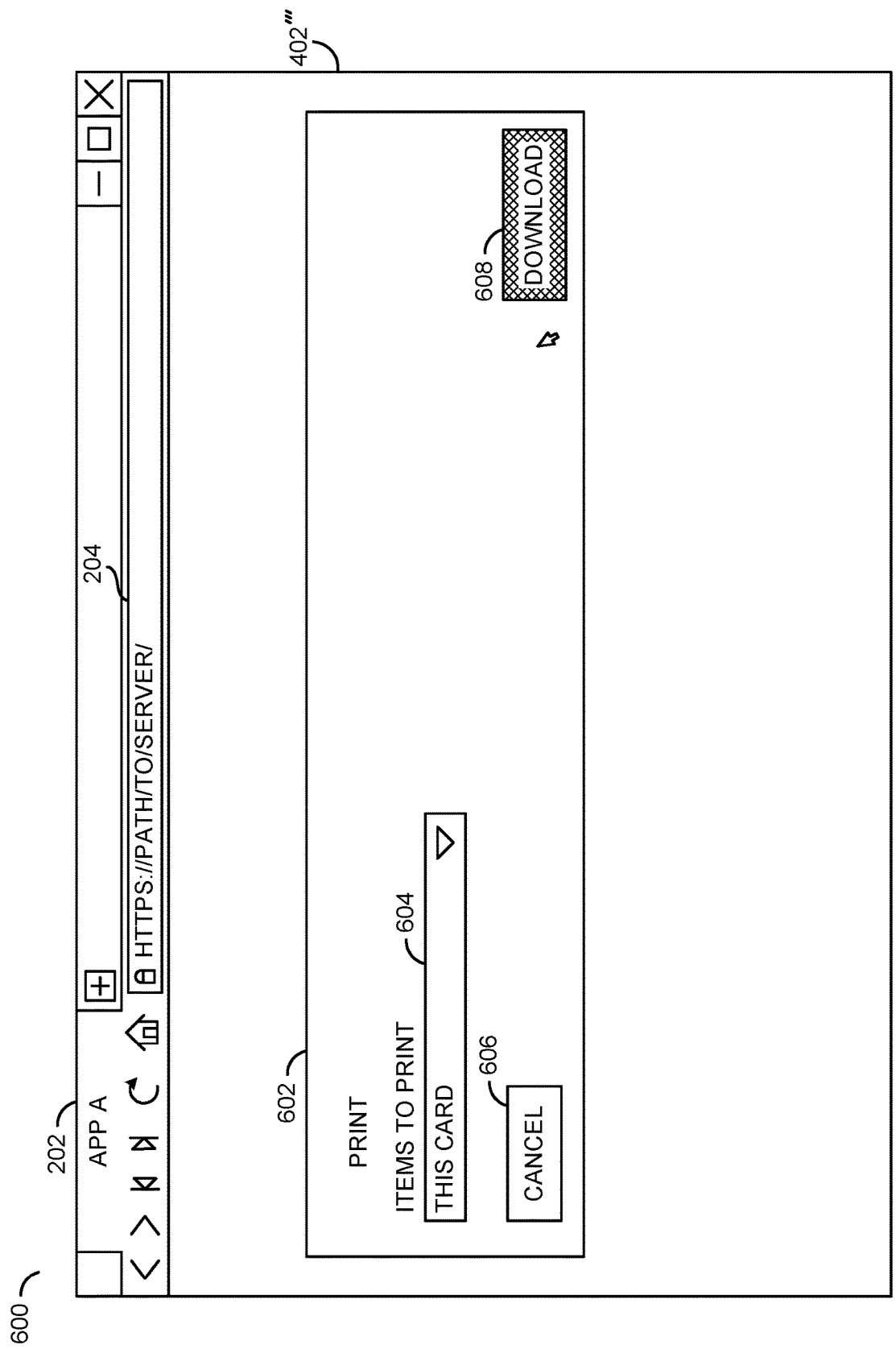
FIG. 14 is a diagram illustrating an example application interface enabling a printing feature.

Referring to FIG. 14, a diagram illustrating an application interface example 600 enabling a printing feature is shown. The application interface example 600 enabling a printing feature may be shown in the context of the web browser 202. The application interface (or database interface) 402''' is shown in the website portion of the web browser 202.

A dialog box 602 is shown on the application interface 402'''. The dialog box 602 may be a printing window overlaid on the application interface 402'''. The dialog box 602 may be configured to enable the user to print and/or export the decks 120a-120n and/or cards 130a-130n of the apps 110a-110n. The exporting/printing may be one of the database operations implemented using the computer readable instructions 100.

The print dialog box 602 may comprise a print selection input 604. In the example shown, the print selection input 604 may be a drop down menu. The print selection input 604 may enable the user to select which items to print. In the example shown, the current selection may be 'this card' (e.g., the current one of the cards 130a-130n). In an example, other options may be a range of cards, cards displayed according to a filter, all the cards, etc.

The print dialog box 602 may comprise a button 606 and/or a button 608. The button 606 may be a cancel button configured to close the print dialog box 602. The button 608 may be a download button to enable the user to print and/or save the objects indicated by the print selection input 604. In one example, the button 608 may enable a user to print a paper copy. In another example, the button 608 may enable a user to download the data (e.g., export to a particular file format such as a PDF). The data type generated using the download button 608 may be varied according to the design criteria of a particular implementation.

Figure 15:
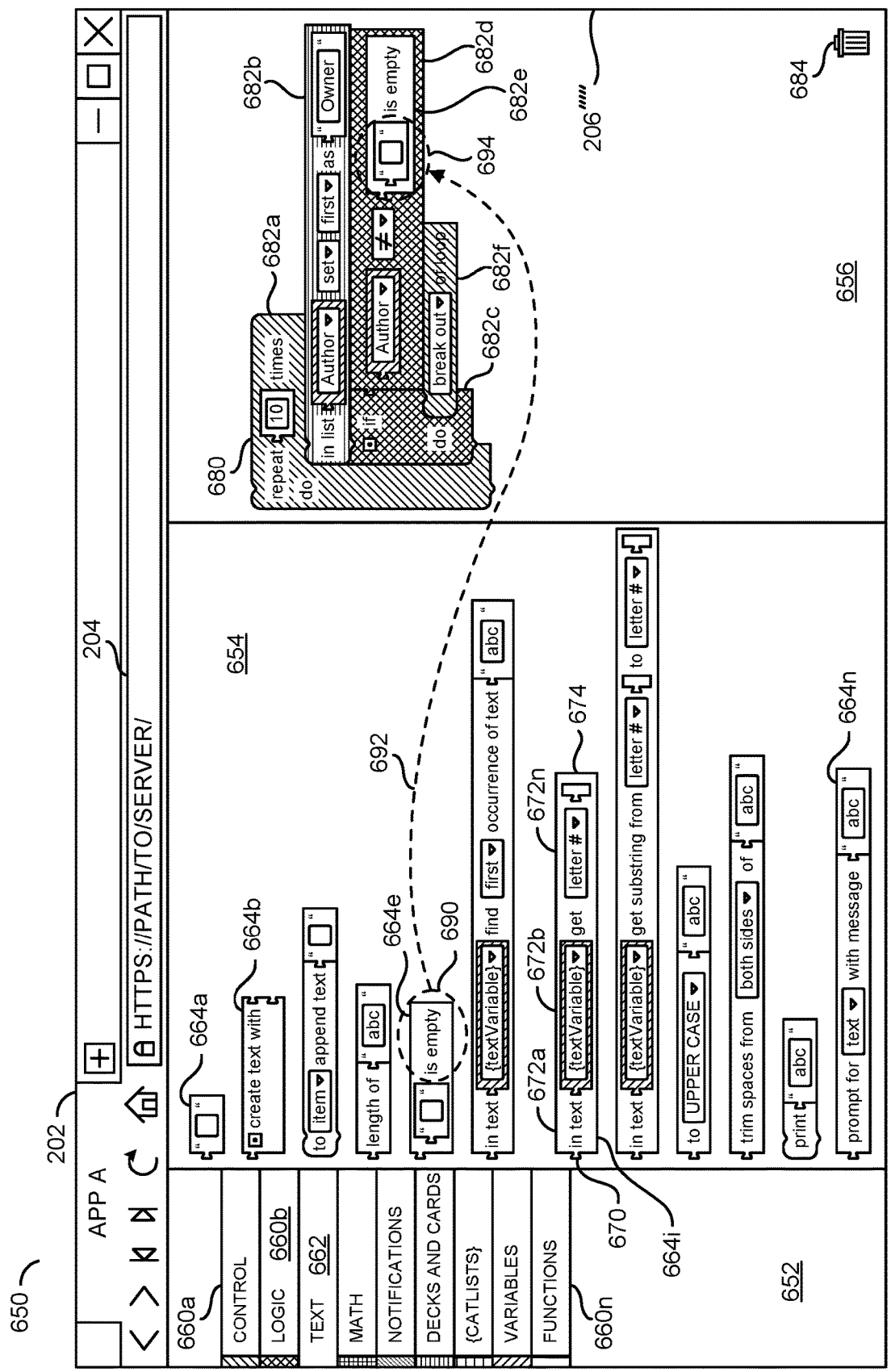
FIG. 15 is a diagram illustrating an example data input interface for a drag and drop no code implementation.

Referring to FIG. 15, a diagram illustrating an example 650 of a data input interface for a drag and drop no code implementation is shown. The data input interface example 650 may be shown in the context of the web browser 202. Options for creating and/or defining logic for the app 110i are shown within the data input interface 206''''.

The data input interface 206'''' may be generated in response to the computer readable instructions 100, the information stored in the database 102 and/or the assumptions 104. In an example, the data input interface 206'''' may enable a drag and drop, no code implementation. The data input interface 206'''' may be generated in response to the constraints defined by the assumptions 104. For example, the data input interface 206'''' may be configured to enable a user to extend the functionality of the app 110i without knowledge of coding syntax. The data input interface 206'''' may be configured to provide various pre-defined logic constructs (or blocks) that may be arranged to enable a user to build functions within the constraints defined by the assumptions 104 (e.g., to ensure that the database schema is valid). The data input interface 206'''' may provide the pre-defined logic blocks with visual cues that indicate how the logic blocks may be combined in order to guide the user to indirectly implement code. For example, the data input interface 206'''' may provide an indirect coding implementation.

In the example shown, the data input interface 206'''' may comprise a section 652, a section 654 and/or a section 656. In the example shown, the sections 652-656 are arranged vertically. However, the sections 652-656 may be arranged horizontally and/or may be resized by the user. The section 652 may be a logic type selection section. The section 654 may be a logic block selection section. The section 656 may be a logic structure section.

The logic type selection section 652 may comprise a number of buttons 660a-660n. The buttons 660a-660n may be used to select various logic type categories. In the example shown, the logic type category 660a may be a 'control' logic type category, the logic type category 660b may be a 'logic' logic type category, and the logic type category 660n may be a 'functions' logic type category. Other examples of the logic type categories 660a-660n may further comprise math, notifications, decks and cards, catlists, and/or variables. The available logic type categories 660a-660n may be varied according to the design criteria, the constraints and/or the assumptions 104.

A selected logic category 662 is shown. In the example shown, the selected logic category 662 may be the 'text' logic type category 660c. The selected logic category 662 may affect what is displayed on the logic block selection section 654. For example, when the 'text' logic type category 660c is the selected logic category 662, the logic block selection section 654 may provide options for 'text' logic blocks. When the user selects another selected logic block category 662, the logic block selection section 654 may change corresponding to the selection.

The logic block selection section 654 may comprise a number of available logic constructs (or blocks) 664a-664n. The available logic blocks 664a-664n may be a filtered list of logic blocks that correspond to the selected logic category 662. In the example shown, the selected logic category 662 may be 'text' and the available logic blocks 664a-664n may correspond to available text logic blocks. In another example, if the user selects the 'control' logic type category 660a, the logic block selection section 654 may be updated to display the available logic blocks 664a-664n that correspond to 'control' logic. Which of the logic blocks 664a-664n correspond to which category of logic may be pre-defined according to the constraints and/or assumptions 104.

A logic block 664i is shown. The logic block 664i may be a representative example of the logic blocks 664a-664n (e.g., each of the logic block 664a-664n may generally have similar features and/or functionality with some differences). The logic block 664i is shown having a beginning edge 670, a number of portions 672a-672n and an ending edge 674. The type of beginning edge 670, the portions 672a-672n and/or the ending edge 674 may be pre-defined according to the constraints and/or assumptions 104.

The beginning edge 670 may comprise a shape. In the example shown, the beginning edge 670 may have a shape of the puzzle piece (or key or male end). The beginning edge 670 may be configured to connect with an ending edge 674 of another one of the logic blocks 664a-664n. Similarly, the ending edge 674 may comprise a shape. In the example shown, the ending edge 674 may have a flat shape. With the ending edge 674 having the flat shape, the logic block 664i may not connect to a beginning edge 670 of another of the logic blocks 664a-664n. In another example, the ending edge 674 may have a shape of a puzzle piece (or keyhole or female end). The beginning edge 670 may be configured to connect with an ending edge 674 of another one of the logic blocks 664a-664n.

The logic blocks 664a-664n may connect with each other by fitting the beginning edge 670 of a second one of the logic blocks 664a-664n to a corresponding ending edge 674 of a first one of the logic blocks 664a-664n. The beginning edge 670 may have one of a number of different shapes. The ending edge 674 may have one of a number of different shapes that correspond to the beginning edge shapes. For example, the male (or key) shape of the beginning edge 670 may fit with the female (or keyhole) shape of the ending edge 674. Many of the shapes of the beginning edge 670 and the shapes of the ending edge 674 may not fit together. The various shapes of the beginning edge 670 and the ending edge 674 may be defined based on the constraints defined by the assumptions 104.

In the example shown, each of the ending edges 674 (except for the logic block 664b) of the text type logic blocks 664a-664n have the flat edge, while each of the beginning edges 670 have a male edge indicating that the text type logic blocks may not connect with another of the shown text type logic blocks (e.g., the text type logic blocks may connect with the logic blocks of another category). By providing the beginning edges 670 and the ending edges 674 with particular shapes that may restrict how the logic blocks 664a-664n fit together, the constraints defined by the assumptions 104 may ensure that the user may not fit together the logic blocks 664a-664n in such a way that creates an illegal operation (e.g., an operation that may crash the app 110i, put the app 110i in a non-functioning and/or erroneous operating state or result in an invalid database schema).

The portions 672a-672n may provide the functionality of the logic blocks 664a-664n. In the example logic block 664i, three portions (e.g., the portion 672a, the portion 672b and the portion 672n) are shown. The number of portions 672a-672n in each of the logic blocks 664a-664n may be defined by the constraints and/or assumptions 104. Each of the portions 672a-672n may represent the computer readable instructions 100 that may be implemented when the corresponding logic blocks 664a-664n are selected.

In the example logic block 664i, the portion 672a may provide a search in text functionality. In the example logic block 664i, the portion 672b may provide a variable functionality. In the example shown, the portion 672b may comprise a drop-down menu to enable the user to select a particular variable that is available to the app 110i. In the example logic block 664i, the portion 672n may provide a get letter location number functionality. In the example shown, the portion 672c may comprise a drop-down menu to enable the user to select a letter location number. Together, the portion 672a, the portion 672b and the portion 672n of the example logic block 664i may be configured to perform a string operation on a user-selected text variable to search the text variable and retrieve a particular letter from the text variable that is in a user-selected position (e.g., if the text variable is the string 'hello world' and the user selected position is '3', the logic block 664i may return the letter 'l').

In some embodiments, the section 652 may provide a legend of the various types of logic. For example, each of the buttons 660a-660n are shown having a pattern. The pattern of the buttons 660a-660n may correspond to the portions 672a-672n of the logic blocks 664a-664n. The pattern on the buttons 660a-660n may act as a legend to provide a visual indication of the type of logic each of the portions 672a-672n represents.

The logic structure section 656 may comprise the various logic blocks that have been selected by the user. The user may chain together the logic blocks 664a-664n selected from the logic block selection section 654 to add functionality of the app 110i.

A data model (or logic structure) 680 is shown in the logic structure section 656. The logic structure 680 may comprise a number of selected logic blocks 682a-682n. The selected logic blocks 682a-682n may be selected from the logic blocks 664a-664n of the logic block selection section 654. The selected logic blocks 682a-682n may be connected together to form a chain of logic that is within the constraints defined by the assumptions 104.

An icon 684 is shown. The icon 684 may be a trash can icon. The user may use the trash can icon 684 to remove one or more of the selected logic blocks 682a-682n from the logic structure 680. In one example, the user may click and drag one of the selected logic blocks 682a-682n to the trash can 684. Dropping one of the selected logic blocks 682a-682n may delete the selected logic block 682a-682n from the logic structure section 656.

A dotted circle 690 is shown on one of the logic blocks 664a-664n (e.g., the logic block 664e) in the logic block selection section 654. A dotted line 692 is shown from the logic block selection section 654 to the logic structure section 656. A dotted circle 694 is shown on one of the selected logic blocks 682a-682n (e.g., the selected logic block 682e). The dotted line 692 may be connected from the dotted circle 690 to the dotted circle 694.

The dotted circle 690, the dotted line 692 and the dotted circle 694 may represent a drag and drop operation by the user. For example, the user may click (or tap and hold for a touchscreen interface) at the location of the dotted circle 690 to select the logic block 664e, and drag the logic block 664e (e.g., represented as the dotted line 692) to the logic block structure section 654. The dotted circle 694 may represent where the user release the logic block 664e (e.g., drops by releasing a mouse button or removing a finger from a touchscreen interface). When the user drops the logic block 664e at the dotted circle 694, the logic block 664e may become the selected logic blocks 682e that is part of the logic structure 680.

The drag and drop data input interface 206'''' may provide an easy-to-use and/or intuitive interface for creating the logic structure 680. The beginning edges 670 and the end edges 672 may indicate which of the logic blocks 664a-664n may fit together to create a valid logic structure 680. The portions 672a-672n may provide a description of the functionality of each of the logic blocks 664a-664n. When performing the drag and drop operation to add one of the logic blocks 664a-664n to the logic structure 680, if either the beginning edge 670 or the ending edge 674 does not fit into the location that the user performs the drop (e.g., the dotted circle 694), the data input interface 206'''' may reject and/or prevent the particular logic block 664a-664n from being dropped (e.g., because the logic would create an invalid data schema).

The drag and drop data input interface 206'''' may enable a no code implementation. For example, the user may drag and drop the various logic constructs 664a-664n to create the logic structure 680 without typing out code syntax. For example, the portions 672a-672n may represent the pre-defined code syntax of each of the logic blocks 664a-664n. The beginning edge 670 and the ending edge 674 may prevent the user from connecting logic blocks that would result in invalid code.

The logic structure 680 may comprise computer readable instructions (e.g., each of the portions of the 672a-672n of the selected logic blocks 682a-682n). The computer readable instructions represented by the logic structure 680 may be executed from top to bottom. To ensure that the data schema is valid, the shape of each of the selected logic blocks 682a-682n may fit together.

In the example shown, the logic structure 680 may start with the selected logic block 682a (e.g., the selected logic block 682a may represent loop logic). The selected logic block 682b may be executed next. The selected logic block 682b may fit together with the selected logic block 682a. Next, the selected logic block 682c may be executed. The selected logic block 682c may fit together with both the selected logic block 682a and the selected logic block 682c. The selected logic block 682c may represent an if statement logic. The selected logic block 682c may connect with the selected logic block 682d and the selected logic block 682e. The selected logic block 682d may connect to a condition portion of the if statement of the selected logic block 682c. The selected logic block 682f may connect to a do portion of the if statement of the selected logic block 682c. For example, if the condition of the selected logic block 682e is determined to be true, then the functionality of the selected logic block 682f may be performed. The logic structure 680 may be performed until the bottom of the logic structure 680 is reached.

Figure 16:
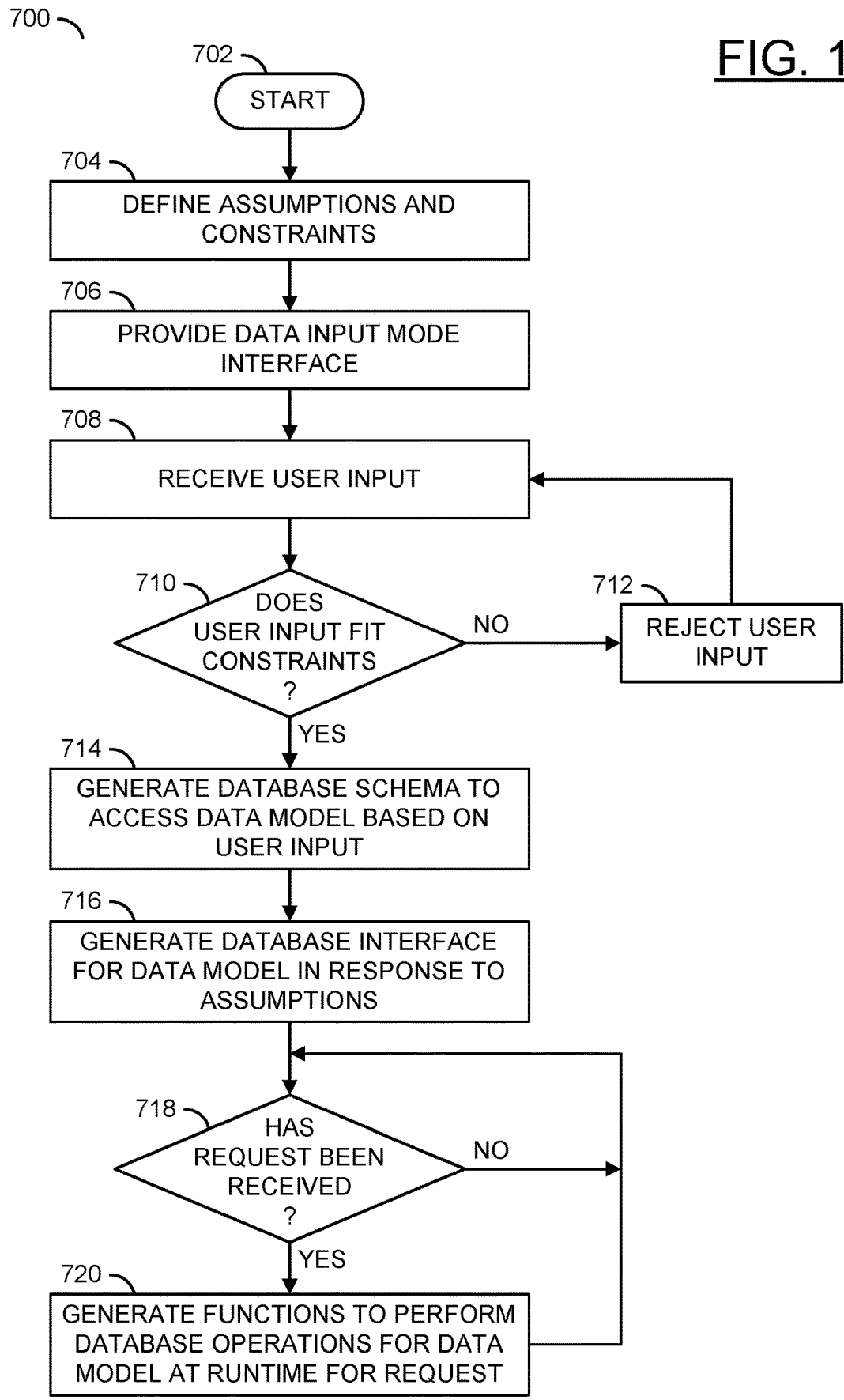
FIG. 16 is a flow diagram illustrating a method for generating an application.

Referring to FIG. 16, a method (or process) 700 is shown. The method 700 may generate an application. The method 700 generally comprises a step (or state) 702, a step (or state) 704, a step (or state) 706, a step (or state) 708, a decision step (or state) 710, a step (or state) 712, a step (or state) 714, a step (or state) 716, a decision step (or state) 718, and a step (or state) 720.

The step 702 may start the method 700. Next, in the step 704, the assumptions and/or constraints 104 may be defined. In an example, the assumptions and/or constraints 104 may be defined by a supplier of the computer readable instructions 100. Next, in the step 706, the data input mode interface may be provided by executing the computer readable instructions 100. For example, the assumptions 104 may be defined at a software level. The assumptions 104 may be defined before the users 150a-150n have access to the data input mode.

In an example, the data input mode 206 may be the deck property input 200 shown in association with FIG. 4, the app creation interface 250 shown in association with FIG. 5, the deck setup interface 300 shown in association with FIG. 6, the property setup interface 350 shown in association with FIG. 7, the card modification interface 450 shown in association with FIG. 9, the drag and drop interface 650 shown in association with FIG. 15 and/or other interfaces. Generally, the input interfaces may be presented to the computing devices 50a-50n. Next, in the step 708, the computing devices 50a-50n may receive the user input. Next, the method 700 may move to the decision step 710.

In the decision step 710, the processor 62 may determine whether the user input fits the constraints defined by the assumptions 104. For example, the computer readable instructions 100 may check the user input against the assumptions 104. If the user input does not fit the constraints defined by the assumptions 104, the method 700 may move to the step 712. In the step 712, the user input may be rejected. For example, a notification may be presented to the computing devices 50a-50n indicating that invalid input has been received. Next, the method 700 may return to the step 708. In the decision step 710, if the user input does fit the constraints (e.g., the user input would result in a valid database schema), the method 700 may move to the step 714.

In the step 714, the computer readable instructions 100 may be executed by the processor 62 to generate the database schema to access the data model based on the user input. For example, the database schema and/or the data model may be stored by the database 102. Next, in the step 716, the computer readable instructions 100 may be executed by the processor 62 to generate the database interface for the data model in response to the assumptions 104. The database interface 402 may be presented to the computing devices 50a-50n. The database interface 402 may be the application selection interface 400 shown in association with FIG. 8, the card displays 500 shown in association with FIGS. 10-12, the filter dialog box 552 shown in association with FIG. 13, the print dialog box 602 shown in association with FIG. 14 and/or other database interfaces. Next, the method 700 may move to the decision step 718.

In the decision step 718 the processor 62 may determine whether a request has been received by the user. For example, the user may use the touchscreen 52b to request database operations using the apps 110a-110n. If the request has not been received, the method 700 may return to the decision step 718. If the request has been received, the method 700 may move to the step 720. In the step 720, the processor 62 may execute the computer readable instructions 100 to generate functions to perform the database operations for the data model at the runtime for each request. Next, the method 700 may return to the decision step 718.

Figure 17:
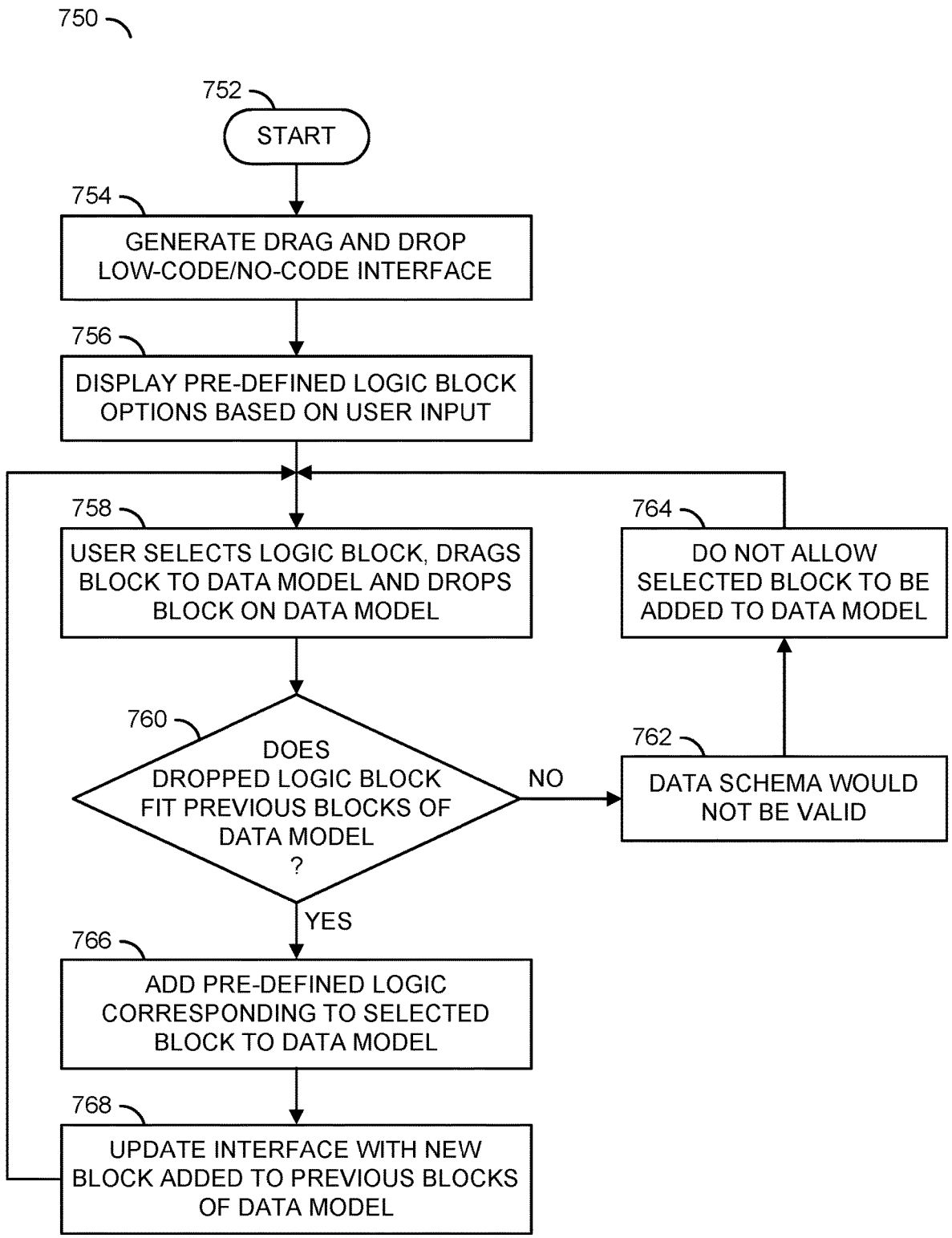
FIG. 17 is a flow diagram illustrating a method for defining a data model in response to no code input.

Referring to FIG. 17, a method (or process) 750 is shown. The method 750 may define a data model in response to no code input. The method 750 generally comprises a step (or state) 752, a step (or state) 754, a step (or state) 756, a step (or state) 758, a decision step (or state) 760, a step (or state) 762, a step (or state) 764, a step (or state) 766, and a step (or state) 768.

The step 752 may start the method 750. In the step 754, the computer readable instructions 100 may be executed to generate the drag and drop low-code/no-code interface 206''''. Next, in the step 756, the drag and drop interface 206'''' may display the pre-defined logic block options 664a-664n based on the user input (e.g., based on the selection of the logic type categories 660a-660n). In the step 758, the user may select the logic block (e.g., click on the logic block 664e at the location 690), drag the logic block (e.g., the path 692) to the data structure model 680 and drop the block (e.g., release the logic block 664e at the location 694) on the data model structure 680. Next, the method 750 may move to the decision step 760.

In the decision step 760, the computer readable instructions 100, the assumptions 104 and/or constraints and/or the data input interface 206'''' may determine whether the dropped logic block fits the previous blocks (e.g., the selected logic blocks 682a-682f) of the data model 680. If the dropped logic block does not fit the previous blocks of the data model 680, the method 750 may move to the step 762. In the step 762, the data schema may be determined to be not valid (e.g., if the dropped logic block were to be part of the data model 680). Next, in the step 764, the assumptions/constraints 104, the computer readable instructions 100 and/or the data input interface 206'''' may not allow the selected block to be added to the data model 680. Next, the method 750 may return to the step 758.

In the decision step 760, if the dropped logic block does fit the previous blocks of the data model 680 (e.g., based on the beginning edges 670 and the ending edges 674), the method 750 may move to the step 766. In the step 766, the computer readable instructions 100 may add to the data model 680 the pre-defined logic (e.g., the pre-defined code represented by the portions 672a-672n) corresponding to the selected logic block. Next, in the step 768, the data input interface 206'''' may be updated with the new block (e.g., the block 682e) added to the previous blocks 682a-682f of the data model 680. Next, the method 750 may return to the step 758.

The computer readable instructions 100 may be configured to implement the application development platform 10 as a low-code and/or no-code environment. For example, a user may develop and/or customize the apps 110a-110n using a low-code and/or no-code implementation. The low-code implementation may be an environment that enables the user to build the apps 110a-110n with a small depth of knowledge of a coding language and/or using code in isolation. In one example, a drag-and-drop interface builder may be a low-code and/or no-code implementation. In another example, using the drop-down menus and/or text box inputs (as shown in association with FIGS. 4-7) may be a low-code and/or no-code implementation.

Generally, a low-code implementation may not involve using syntax from a traditional coding language (e.g., C, C++, Python, Perl, Ruby, etc.). However, the low-code implementation may comprise some coding knowledge to extend the capabilities of the provided interfaces. In one example, a user may want to include validation criteria for an input field (e.g., to ensure that a date data field has received data provided in a YYYY/MM/DD date format). The validation criteria may be defined using a regular expression. A regular expression may not be considered a complex language but does include knowledge of coding to define. For example, the user may need to be trained in regular expression language to properly implement the validation criteria (e.g., which may range from fairly trivial learning to quite extensive training, depending on the rules that the user wishes to implement).

The guided indirect coding implemented by the computer readable instructions 100 may be a low code implementation configured to provide pre-defined logic constructs. The pre-defined logic constructs may comply with the constraints defined by the assumptions 104. In the low code implementation, the pre-defined logic constructs may be expandable using code syntax. In one example, data input by the user may be validated (e.g., to ensure a particular format for a date input, for a dollar amount input, for a phone number input, etc.). In one example, the data input mode 206''' shown in association with FIG. 7 may be a low-code implementation comprising drop-down menus with pre-defined options that conform to the constraints.

The no-code implementation may be an environment that enables development of the apps 110a-110n that does not comprise extensibility (e.g., hooks) using syntax from a programming language. For the no-code implementation, the user may be isolated in an environment and/or may be restricted to particular choices. The assumptions 104 may define the restrictions (or constraints). The isolated environment and/or restricted choices for the no-code implementation may be configured to enable an informally trained user to develop the apps 110a-110n without knowledge of the syntax and/or use of a programming language. Generally, the no-code implementation may be usable by any reasonably technical user even if the user does not have knowledge of any programming languages. In one example, the no-code implementation may be a drag-and-drop interface constrained by the assumptions 104. In another example, the no-code implementation may be the drop-down menu implementation constrained by the assumptions 104.

The guided indirect coding implemented by the computer readable instructions 100 may be a no code implementation configured to provide pre-defined logic constructs (e.g. The logic blocks 664a-664n shown in association with FIG. 15). The pre-defined logic constructs may comply with the constraints defined by the assumptions 104. In the no code implementation, the constraints may not allow code syntax as the user input. For example, the no code implementation may restrict customization options on data input by the user to enable the users 150a-150n to provide the input to customize the objects of the data model without using code syntax. Instead, each of the pre-defined logic constructs 664a-664n may provide the code syntax used to implement the logic selected by the users. By implementing the logic blocks 664a-664n instead of accepting code syntax, the guided indirect coding implemented by the computer readable instructions 100 may restrict customization in favor of ease of use and lower technical proficiency standards for the end user. In one example, the data input mode 206'''' shown in association with FIG. 15 may be a no-code implementation comprising a drag and drop interface that represents the pre-defined logic constructs as shapes that fit together according to the constraints.

In some embodiments, the computer readable instructions 100 may be configured to implement a combination of low-code and no-code interfaces. For example, the application development platform 10 may provide a no-code approach for many data structures, business rules and/or user interface specifications, while providing some low-code features. Generally, providing a low-code environment or a no-code environment may be a trade-off between simplicity (e.g., ease of use) and features that provide extensibility and customization.

The low-code and/or no-code implementation provided by the computer readable instructions 100 may enable the development platform 10 to be quickly accessed, the apps 110a-110n to be developed from scratch quickly, the apps 110a-110n to be deployed quickly and/or reduce an amount of time to become proficient in using the development platform 10, compared to learning a programming language. The low-code and/or no-code implementation provided by the computer readable instructions 100 may enable indirect coding using pre-defined logic structures.

The low-code and/or no-code implementation provided by the computer readable instructions 100 may be configured to guide the user through generating the logic constructions and/or data schemas used by the apps 110a-110n. The low-code and/or no-code implementation by the computer readable instructions 100 may be configured to provide a guided, indirect code implementation. The guided, indirect code implementation may enable a user to develop the apps 110a-110n quickly and without formal training by providing limitations on customization based on the assumptions 104 (e.g., the assumptions 104 may introduce constraints on customization in order to streamline the development process). The implementation of the low-code and/or no-code environment may be varied according to the design criteria of a particular implementation.

The constraints and/or assumptions 104 may be implemented so that the computer readable instructions 100 may enable the applications 110a-110n to access the data model (e.g., the data model 680) and ensure that the database schema is valid. The database schema may be data elements and/or attributes of each data element that, when combined, provide a working model of a system. The system may be the persistent storage of application information that may be contained and/or accessed with one or more of the applications 110a-110n.

The functions performed by the diagrams of FIGS. 1-17 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A method for generating an application, comprising the steps of:
   (A) defining a plurality of assumptions;
   (B) providing a data input mode configured to receive user input, wherein (i) said user input enables a customization of one or more objects of a data model for said application and (ii) said assumptions provide constraints for said user input;
   (C) generating a database schema configured to enable said application to access said data model, wherein (i) said database schema is configured to be altered in response to said user input, (ii) altering said database schema comprises adding or removing data structures after said database schema has been generated and (iii) said constraints ensure said database schema is valid after said database schema has been altered;
   (D) generating a database interface for said data model in response to said assumptions, wherein said assumptions define a location for displaying said objects on said database interface; and (E) generating functions to perform database operations for said data model at runtime for each request, wherein
  (a) said data input mode enables said user input to customize said objects via a guided indirect code implementation,
  (b) said database interface enables a user to modify properties of said objects,
  (c) said database interface comprises a dynamic application programming interface configured to perform said database operations for said data model,
  (d) said guided indirect code implementation is a no code implementation configured to provide pre-defined logic constructs,
  (e) said pre-defined logic constructs comply with said constraints,
  (f) said constraints for said no code implementation does allow code syntax as said user input,
  (g) said no code implementation is enabled by said data input mode,
  (h) said data input mode comprises a drag and drop interface,
  (i) said drag and drop interface represents said pre-defined logic constructs as shapes that fit together according to said constraints and
  (j) said shapes of said pre-defined logic constructs are configured to restrict said pre-defined logic constructs from fitting together in said drag and drop interface to prevent an illegal operation according to said database schema.

2. The method according to claim 1, wherein said location defined by said assumptions is adjusted without input from said user.

3. The method according to claim 1, wherein said assumptions are defined before said user has access to said data input mode.

4. The method according to claim 1, wherein (i) said assumptions comprise pre-defined locations for said objects and (ii) said pre-defined locations are based on a class of said objects.

5. The method according to claim 1, wherein said assumptions are defined at a software level.

6. The method according to claim 1, wherein said data input mode is configured to enable altering said data schema to react to said user input based on said assumptions.

7. The method according to claim 1, wherein (i) said guided indirect code implementation further comprises a low code implementation configured to provide said pre-defined logic constructs, and (ii) said pre-defined logic constructs are expandable using said code syntax.

8. The method according to claim 7, wherein (i) said low code implementation is enabled by said data input mode and (ii) said data input mode comprises a drop-down menu interface with pre-defined options that conform to said constraints.

9. The method according to claim 1, wherein said constraints for said no code implementation are configured to restrict customization options to enable a user to provide said user input to customize said one or more objects without using said code syntax.

10. The method according to claim 1, wherein said assumptions are updatable.

11. The method according to claim 1, wherein said data input mode and said database interface are accessible from and adapt to a screen size of a desktop computer, a laptop computer, a smartphone and a tablet computing device.

12. The method according to claim 1, wherein said database operations comprise one or more of a search, a filter, an edit and a print.

13. The method according to claim 1, wherein said guided indirect code implementation enables a user to develop said application quickly and without formal training by providing limitations to said customization based on said assumptions.

14. A storage medium containing processor executable instructions configured to perform the steps of:
  (A) defining a plurality of assumptions;
  (B) providing a data input mode configured to receive user input, wherein (i) said user input enables a customization of one or more objects of a data model for an application and (ii) said assumptions provide constraints for said user input;
  (C) generating a database schema configured to enable said application to access said data model, wherein (i) said database schema is configured to be altered in response to said user input, (ii) altering said database schema comprises adding or removing data structures after said database schema has been generated and (iii) said constraints ensure said database schema is valid after said database schema has been altered;
  (D) generating a database interface for said data model in response to said assumptions, wherein said assumptions define a location for displaying said objects on said database interface; and
  (E) generating functions to perform database operations for said data model at runtime for each request, wherein
    (a) said data input mode enables said user input to customize said objects via a guided indirect code implementation,
    (b) said database interface enables a user to modify properties of said objects,
    (c) said database interface comprises a dynamic application programming interface configured to perform said database operations for said data model,
    (d) said guided indirect code implementation is a no code implementation configured to provide pre-defined logic constructs,
    (e) said pre-defined logic constructs comply with said constraints,
    (f) said constraints for said no code implementation does allow code syntax as said user input,
    (g) said no code implementation is enabled by said data input mode,
    (h) said data input mode comprises a drag and drop interface,
    (i) said drag and drop interface represents said pre-defined logic constructs as shapes that fit together according to said constraints and
    (j) said shapes of said pre-defined logic constructs are configured to restrict said pre-defined logic constructs from fitting together in said drag and drop interface to prevent an illegal operation according to said database schema.

* * * * *